United States Patent
Furusawa et al.

(10) Patent No.: US 9,276,275 B2
(45) Date of Patent: Mar. 1, 2016

(54) FUEL CELL SYSTEM

(71) Applicant: Honda Motor Co., Ltd., Tokyo (JP)

(72) Inventors: Koichiro Furusawa, Saitama (JP); Kaoru Yamazaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 264 days.

(21) Appl. No.: 13/896,752

(22) Filed: May 17, 2013

(65) Prior Publication Data

US 2013/0309590 A1 Nov. 21, 2013

(30) Foreign Application Priority Data

May 18, 2012 (JP) .................................. 2012-114563
May 25, 2012 (JP) .................................. 2012-120069

(51) Int. Cl.
*H01M 8/04* (2006.01)

(52) U.S. Cl.
CPC ...... *H01M 8/04104* (2013.01); *H01M 8/04089* (2013.01); *H01M 8/04238* (2013.01); *H01M 8/04753* (2013.01); *H01M 8/04097* (2013.01); *H01M 8/04223* (2013.01); *Y02E 60/50* (2013.01)

(58) Field of Classification Search
CPC ...................... H01M 8/04104; H01M 8/04223
See application file for complete search history.

(56) References Cited

FOREIGN PATENT DOCUMENTS

| JP | 2005-166424 | 6/2005 |
|---|---|---|
| JP | 2006-209996 | 8/2006 |
| JP | 2007-323873 | 12/2007 |
| JP | 2009-21025 | 1/2009 |
| JP | 2009-181964 | 8/2009 |
| JP | 2011-258466 | 12/2011 |
| WO | 2011/086603 A1 | 7/2011 |

OTHER PUBLICATIONS

Japanese Office Action for Application No. 2012-120069, 3 pages, dated Jan. 21, 2013.
Japanese Office Action for Application No. 2012-114563, 3 pages, dated Dec. 17, 2013.

*Primary Examiner* — Jane Rhee
(74) *Attorney, Agent, or Firm* — Nelson Mullins Riley & Scarborough LLP; Anthony A. Laurentano

(57) ABSTRACT

Provided is a fuel cell system capable of preventing a fuel cell from being polarized at a high potential for a long time during start-up. A fuel cell system 1 includes a first injector 23A and a second injector 23B in a fuel gas inlet passage. When an ECU 60 determines that a power generation down time is equal to or more than a predetermined period at start-up of a fuel cell stack 10, a target pressure of hydrogen supplied to an anode passage 12 is set to be higher for supply than when the power generation down time is less than the predetermined period. In addition, as the power generation down time of the fuel cell stack 10 becomes longer, the target pressure is set to be higher. Also, a pressure increase in the fuel cell stack is set to be lower than that during ordinary power generation.

17 Claims, 13 Drawing Sheets

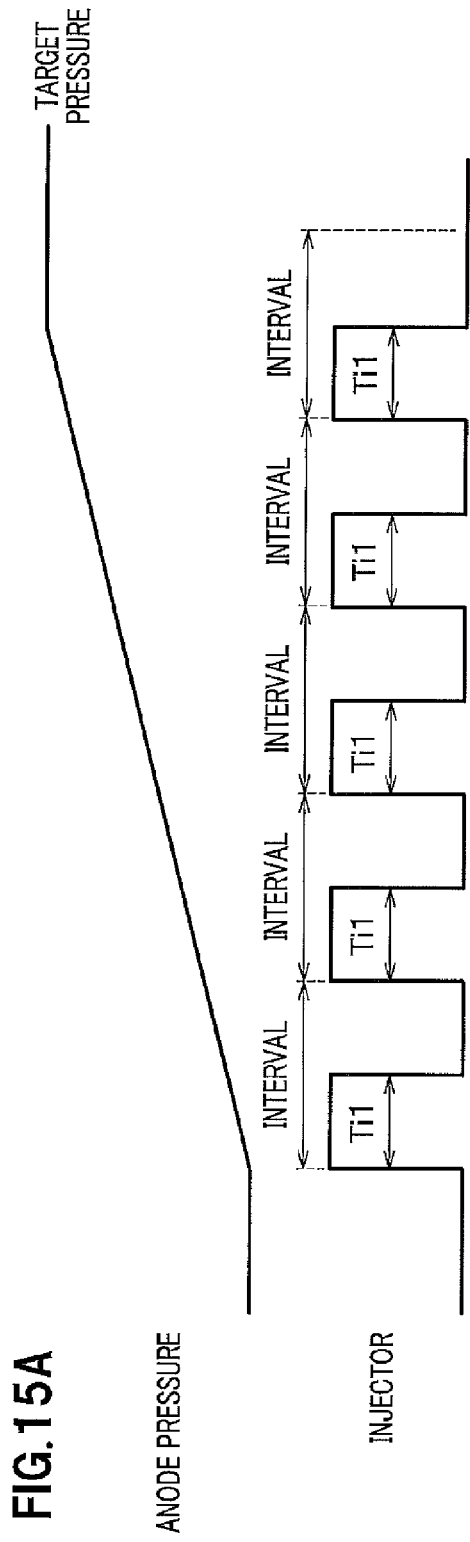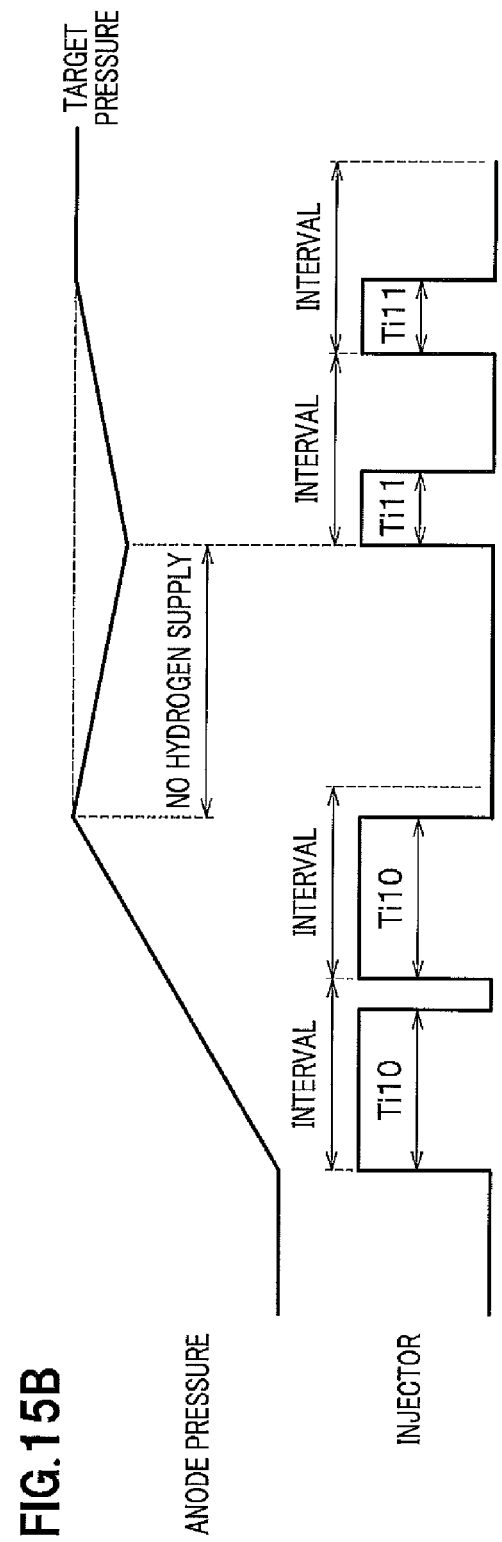

FUEL CELL SYSTEM

CROSS REFERENCE TO RELATED APPLICATIONS

This application claims the foreign priority benefit under 35 U.S.C. §119 of Japanese Patent Application No. 2012-114563 filed on May 18, 2012, and Japanese Patent Application No. 2012-120069 filed on May 25, 2012. The disclosures of both applications are incorporated herein by reference.

TECHNICAL FIELD

The present invention relates to a fuel cell system having an on-off valve such as an injector in a fuel supply passage.

BACKGROUND ART discloses that a pressure level of fuel gas upstream of an injector is lower at start-up than that during ordinary operation of a fuel cell.

In the fuel cell system disclosed in JP2007-323873A, however, when inner gas of an anode passage in a fuel cell is replaced with air and the anode passage and a cathode passage each have the air during start-up, a lower pressure upstream of an injector causes a decreased injection volume of the injector and results in a delay to replace the air in the anode passage by hydrogen. Unfortunately, this causes the fuel cell to be polarized at a high potential for a long time.

SUMMARY OF INVENTION

The present invention has solved the above previous problems. It is an object of the present invention to provide a fuel cell system capable of preventing a fuel cell from being polarized at a high potential for a long time at its start-up.

An aspect of the present invention provides a fuel cell system including a fuel cell having an anode passage through which fuel gas is supplied to an anode and a cathode passage through which oxidant gas is supplied to a cathode, a fuel gas inlet passage through which the fuel gas is injected into the fuel cell, a fuel off-gas outlet passage through which fuel off-gas is discharged from the fuel cell, a fuel-gas-pressure-adjusting-and-supplying unit which is disposed on the fuel gas inlet passage and adjusts a pressure of the fuel gas to supply the fuel gas to the anode passage, an anode-passage-gas-replacement-determining unit which determines at start-up of the fuel cell whether or not inner gas of the anode passage is replaced with the oxidant gas, and a high-pressure-fuel-gas-supply-controlling unit which controls a supply of the fuel gas to the anode passage while setting a target pressure of the fuel gas supplied to the anode passage by using the fuel-gas-pressure-adjusting-and-supplying unit to be higher than a pressure when the inner gas of the anode passage is not replaced with the oxidant gas if the anode-passage-gas-replacement-determining unit determines that the inner gas of the anode passage is replaced with the oxidant gas.

Meanwhile, inner gas of an anode passage may be replaced with oxidant gas during a power generation down time of a fuel cell, and the fuel cell may start under the presence of the oxidant gas in both the anode passage and a cathode passage. In that case, when fuel gas is supplied from through an inlet of the anode passage, a difference in the fuel gas concentration becomes larger between the inlet side and the outlet side of the anode passage. While this large concentration difference is kept for a long time, the fuel cell is subject to a high potential polarized condition for a longer period. Thus, it has been found that the above conditions deteriorate the fuel cell.

As described herein, when the fuel cell starts under a condition where inner gas in the anode passage is replaced with the oxidant gas, the target pressure (supply pressure) of the fuel gas supplied to the anode passage is set to be higher than that at ordinary start-up and mixture of the oxidant gas and the fuel gas in the anode passage is promoted, which rapidly reduces a concentration difference in the fuel gas between the inlet side and the outlet side of the anode passage and enables preventing the fuel cell from being polarized at a high potential for a long time.

Note that the conditions in which the inner gas of the anode passage is replaced with the oxidant gas during the power generation down time of the fuel cell mean conditions in which a supply of fuel gas to the anode passage at the next start-up of the fuel cell causes a concentration difference in the fuel gas between the inlet side and the outlet side of the anode passage (i.e., the inlet side has a high concentration and the outlet side has a low concentration).

In addition, the anode-passage-gas-replacement-determining unit determines that when the power generation down time before start-up of the fuel cell is equal to or more than a predetermined period, the inner gas of the anode passage is replaced with the oxidant gas. The high-pressure-fuel-gas-supply-controlling unit is characterized in that when the anode-passage-gas-replacement-determining unit determines that the inner gas of the anode passage is replaced with the oxidant gas, the target pressure is set to be higher than a pressure when the power generation down time is less than the predetermined period.

According to this configuration, if a power generation down time (i.e., in the case of having a predetermined period or longer) becomes long, the inner gas of the anode passage is replaced with the oxidant gas. Consequently, when the fuel cell system starts under a condition under which each of the anode passage and the cathode passage has oxidant gas, a target pressure (supply pressure) of the fuel gas supplied to the anode passage at start-up is set to be higher than a pressure during ordinary power generation. This configuration promotes the mixture of the oxidant gas and the fuel gas in the anode passage. This makes it possible to prevent the fuel cell from being polarized at a high potential for a long time.

In addition, the high-pressure-fuel-gas-supply-controlling unit sets the target pressure to be higher as the power generation down time of the fuel cell becomes longer.

According to this setting, a longer power generation down time requires a longer period to mix the oxidant gas and the fuel gas in the anode passage. Thus, the target pressure should be set to be higher. Then, setting an appropriate target pressure circumvents the need to make the target pressure unnecessarily (wastefully) high.

Also, the high-pressure-fuel-gas-supply-controlling unit is characterized in that a pressure increase in the fuel gas supplied to the anode passage is set to be lower when the fuel cell system starts than a pressure increase during ordinary power generation.

By the way, if a pressure of fuel gas immediately reaches a target pressure at start-up of the fuel cell, a supply of the fuel gas is stopped, so that mixture of oxidant gas and the fuel gas is not facilitated. Then, keeping the pressure increase within a limit can prevent the supply of the fuel gas from being stopped halfway. This promotes the mixture of the oxidant gas and the fuel gas, thereby capable of definitely preventing the fuel cell from being polarized at a high potential for a long time.

In addition, the fuel cell system may include a connection passage which connects the fuel gas inlet passage and the fuel off-gas outlet passage;

a circulator which is disposed partway through the connection passage and returns the fuel off-gas discharged from an outlet of the anode passage to an inlet of the anode passage and a circulator-operation-starting unit which starts operation of the circulator before the high-pressure-fuel-gas-supply-controlling unit supplies the fuel gas.

According to this configuration, the circulator starts before operation of the fuel-gas-pressure-adjusting-and-supplying unit. Then, a gas flow is formed in an anode circulation system (including the connection passage, the fuel gas inlet passage, and the fuel off-gas outlet passage). After that, a supply of fresh fuel gas begins. As a result, mixture of the oxidant gas and the fuel gas can be further facilitated.

In addition, the fuel-gas-pressure-adjusting-and-supplying unit may be an electronically-controlled injector.

By using the electronically-controlled injector as the fuel-gas-pressure-adjusting-and-supplying unit, the system can be more precisely controlled.

Furthermore, the high-pressure-fuel-gas-supply-controlling unit may keep a valve of the injector open.

This configuration makes it possible to continuously supply fuel gas while maintaining the injector under an open valve condition, so that the oxidant gas and the fuel gas can be more efficiently mixed than when the fuel gas is intermittently supplied (i.e., intermittent supply).

Moreover, the high-pressure-fuel-gas-supply-controlling unit may be operated while keeping constant a valve open period per drive period of the injector.

In addition, another aspect of the present invention provides a fuel cell system including: a fuel cell having an anode passage through which fuel gas is supplied to an anode and a cathode passage through which oxidant gas is supplied to a cathode; a fuel gas inlet passage through which the fuel gas is injected into the anode passage; a fuel off-gas outlet passage through which fuel off-gas is discharged from the anode passage; an injector which is disposed across the fuel gas inlet passage and supply to the anode passage the fuel gas of which a pressure is adjusted; and a control unit which performs feedback control on the injector. In addition, the control unit comprises a continuous-injector-operation-driving unit driving the injector during start-up of the fuel cell in such a way that a valve of the injector opens periodically at a constant interval with a valve open period in an injector drive period being kept constant and the feedback control on the injector being prohibited.

This configuration makes it possible to fix the valve open period per drive period without performing the feedback control during start-up of the fuel cell to supply the fuel gas from the injector to the anode passage. Accordingly, when the system starts under a condition under which the inner gas of the anode passage is replaced with the oxidant gas so that both the anode passage and the cathode passage have the oxidant gas, for example, the oxidant gas and the fuel gas can be efficiently mixed in the anode passage. This can prevent a high potential polarization on the fuel cell from continuing.

That is, the injector is actuated while a valve open period (i.e., a Ti value) per drive period (i.e., an interval) is kept constant. This makes it possible to supply fuel gas without stopping the fuel gas supply in the middle to increase a pressure (anode pressure) of fuel gas supplied to the anode passage to a target pressure. This configuration enables the fuel gas to be continually supplied to the anode passage. Also, this configuration can prevent the fuel gas and the oxidant gas from being inefficiently mixed in the anode passage. This configuration can therefore prevent the fuel cell from being polarized at a high potential.

In addition, the fuel cell system may include a down-time-determining unit which determines whether or not a down time before the start-up of the fuel cell is equal to or more than a predetermined period, wherein the constant-injector-operation-driving section operates the injector while keeping constant the valve open period per drive period when the down-time-determining unit determines that the down time is equal to or more than the predetermined period.

When the down time is equal to or more than the predetermined period, this unit determines that the inner gas of the anode passage is replaced with the oxidant gas; and the anode passage and the cathode passage each have the oxidant gas at start-up. When the conditions are so determined, the injector is actuated while the valve open period per drive period is kept constant. Thus, this can prevent the fuel gas from being unnecessarily (wastefully) supplied.

Furthermore, the fuel cell system may include a continuous-supply-period-calculating unit which calculates a period of continually supplying fuel gas (i.e., a continuous supply period) when the constant-injector-operation-driving unit drives the injector. The continuous-supply-period-calculating unit makes the continuous supply period longer as the down time become longer.

According to this configuration, the continuous-supply-period-calculating unit makes the continuous supply period (i.e., a target pressure of fuel gas supplied to the anode passage) vary depending on a ratio of the oxidant gas present in the anode passage. This configuration therefore circumvents the need to unnecessarily (wastefully) prolong the drive period of the injector.

Moreover, the fuel cell system may include an oxidant-gas-supplying unit which supplies the oxidant gas to the cathode passage a pressure difference detecting unit detecting a pressure difference between an anode side and a cathode side of the fuel cell and a start-up-differential-pressure-adjusting unit adjusting an driving of the oxidant-gas-supplying unit to have the pressure difference decreased to less than a threshold when the pressure difference is equal to or more than the threshold while the constant-injector-operation-driving unit is driving the injector during the start-up of the fuel cell.

This configuration keeps the pressure difference between the anode and the cathode from becoming too large, and can therefore prevent the fuel cell from being damaged.

The present invention can provide a fuel cell system capable of preventing a fuel cell from being polarized at a high potential for a long time.

BRIEF DESCRIPTION OF DRAWINGS

FIGS. 15A and 15B illustrate injector control and changes in an anode pressure. FIG. 15A depicts a case of prohibiting feedback control. FIG. 15B depicts a case of having the feedback control.

DESCRIPTION

The following describes an embodiment according to the present invention by referring to FIGS. 1 to 7. Note that a fuel cell vehicle (not shown) (e.g., a vehicle, a moving body), for example, carries a fuel cell system 1 according to an embodiment of the present invention. Examples of the fuel cell vehicle include a four-wheel vehicle, a three-wheel vehicle, a two-wheel vehicle, a one-wheel vehicle, and a train. In this regard, however, the examples may include configurations in which other moving bodies, such as a ship and an airplane, carry the fuel cell system. In addition, the fuel cell system may be used as a stationary system for home and/or business use.

Figure 1:
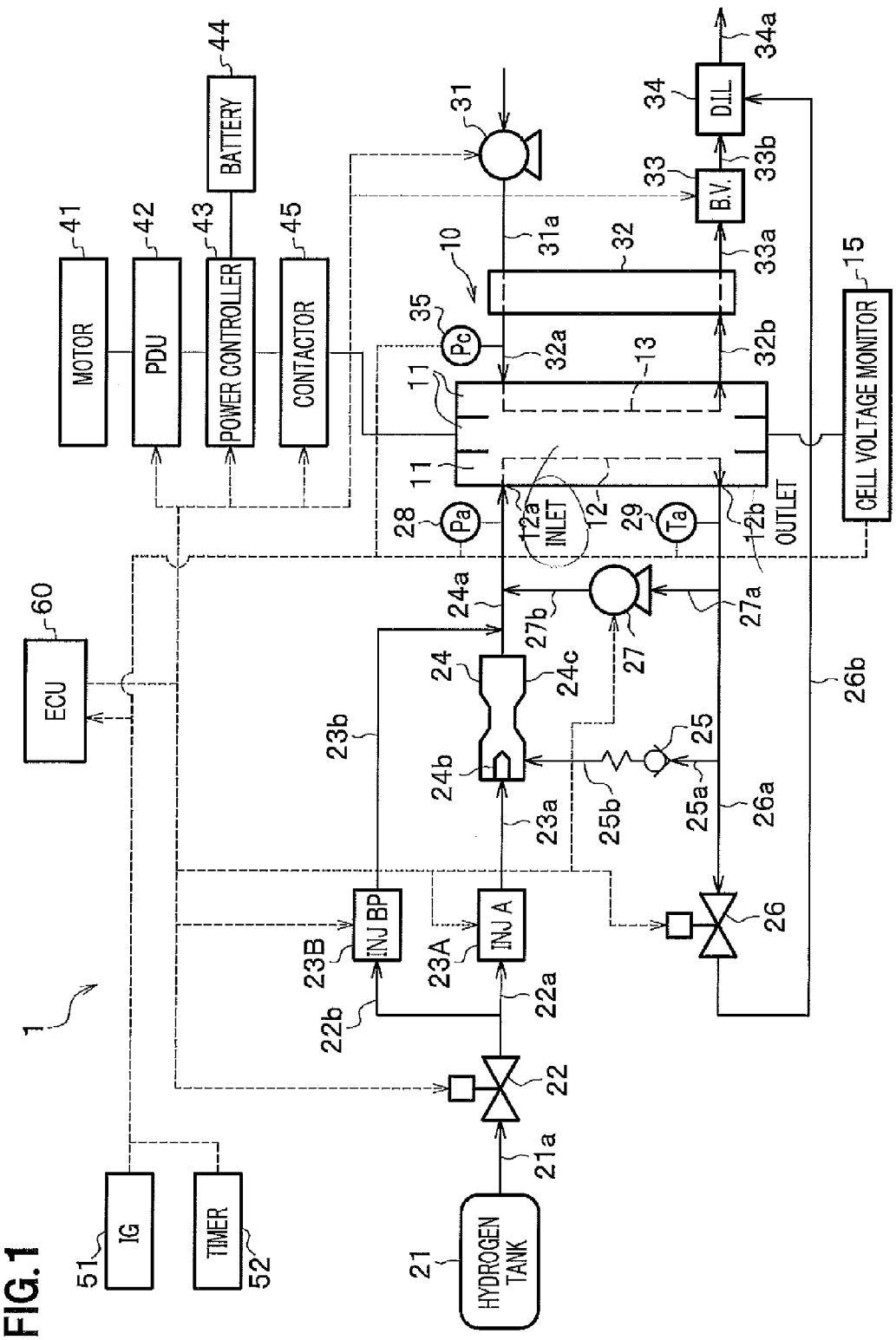
FIG. 1 illustrates how to configure a whole fuel cell system according to an embodiment of the present invention.

As illustrated in FIG. 1, the fuel cell system 1 includes: a fuel cell stack 10; an anode system which supplies hydrogen (i.e., fuel gas, reaction gas) to and exhausts the hydrogen from an anode of the fuel cell stack 10; a cathode system which supplies oxygen-containing air (i.e., oxidant gas, reaction gas) to and exhausts the air from an cathode of the fuel cell stack 10; a power control system which controls power generation of the fuel cell stack 10; and an ECU 60 (Electronic Control Unit) which electronically controls the above stack and systems.

The fuel cell stack 10 is a stack which is constituted by a plurality of solid polymer type single cells 11 that are stacked. In the stack, the plurality of single cells 11 are electrically connected in series. Each single cell 11 includes two conductive separators and an MEA (Membrane Electrode Assembly) interposed therebetween. The MEA includes: an anode and a cathode (electrodes); and an electrolyte membrane (a solid polymer electrolyte membrane) made of, for example, a monovalent-cation exchange membrane, the electrolyte membrane being interposed between the electrodes.

The anode and the cathode each include: a conductive porous body such as carbon paper; and a catalyst (e.g., Pt) for having an electrode reaction progress on the anode and the cathode, the porous body having the catalyst supported thereon.

Each separator is provided with grooves to supply hydrogen or air to the entire surface of each MEA and through-holes to supply/exhaust the hydrogen or the air to/from all the single cells 11. These grooves and through-holes function as an anode passage 12 (i.e., a fuel gas passage) and a cathode passage 13 (i.e., an oxidant gas passage).

Meanwhile, hydrogen is supplied via the anode passage 12 to each anode and air is supplied via the cathode passage 13 to each cathode, so that each single cell 11 generates a potential difference (i.e., an OCV (Open Circuit Voltage)). Next, once the fuel cell stack 10 and an external circuit such as a motor 41 are electrically connected, the fuel cell stack 10 outputs a current and generates power.

A cell voltage monitor 15 is a device which detects a cell voltage per single cell 11. A plurality of single cells 11 constitute the fuel cell stack 10. The cell voltage monitor 15 includes: a monitoring body; and wire harnesses for connecting the monitoring body to each single cell The monitoring body is connected sequentially with each of the single cells 11 and detects a cell voltage of each of the single cells 11 at a predetermined interval. Then, an average cell voltage and a minimum cell voltage are going to be calculated. Subsequently, the body of the monitor (the cell voltage monitor 15) outputs the average cell voltage and the minimum cell voltage to the ECU 60.

The anode system includes: a hydrogen tank 21 (a fuel gas source); a normally closed shut-off valve 22; a first injector 23A (a fuel-gas-pressure-adjusting-and-supplying unit: designated as "INJ A" in FIGS. 1, 5 to 7, 11, 13, and 14); a second injector 23B (a fuel-gas-pressure-adjusting-and-supplying unit: designated as "INJ BP" in FIGS. 1, 5 to 7, 11, 13, and 14); an ejector 24; a check valve 25; a purge valve 26; a hydrogen pump 27; a pressure sensor 28 (an interelectrode-pressure-difference detecting unit); a temperature sensor 29; and the like.

Note that injectors of the same type (those having identical performance), for example, may be used as the first injector 23A and the second injector 23B. Alternatively, an injector that can inject a higher flow volume than the second injector 23B may be used as the first injector 23A. Also, an injector that can inject a higher flow volume than the first injector 23A may be used as the second injector 23B. Accordingly, the injectors can be appropriately modified.

The hydrogen tank 21 is connected to an inlet 12a of the anode passage 12 by way of a pipe 21a, the shut-off valve 22, a pipe 22a, the first injector 23A, a pipe 23a, the ejector 24, and a pipe 24a. The pipe 22a is connected to the pipe 24a by way of a pipe 22b, the second injector 23B, and a pipe 23b. When the first injector 23A and/or the second injector 23B may inject hydrogen while the shut-off valve 22 is kept open, the hydrogen from the hydrogen tank 21 flows through the pipe 21a and others and is supplied to the anode passage 12.

Note that partway through the pipe 22a upstream of a connecting point to the pipe 22b, a pressure-reducing valve (i.e., a regulator, and not shown) which reduces a hydrogen pressure is installed. This pressure-reducing valve may operate by using a pressure in the cathode system as a pilot pressure. Alternatively, this pressure-reducing valve may be electrically controlled independent of the cathode system.

Here, a fuel gas inlet passage is connected to an inlet 12a of the anode passage 12, and hydrogen to be supplied to the anode passage 12 passes through the fuel gas inlet passage including: the pipes 21*a*, 22*a*, 23*a*, 24*a*, 22*b*, and 23*b*. In addition, the ejector 24 is provided at a connecting point between the fuel gas inlet passage and a below-described pipe 25*b* (a connection passage).

Also, the first injector 23A is disposed across the fuel gas inlet passage upstream of the connecting point (ejector 24). Further, a bypass passage connects the above fuel gas inlet passage upstream of the first injector 23A to the above fuel gas inlet passage downstream of the ejector 24A. Accordingly, hydrogen from the hydrogen tank 21 bypasses the first injector 23A and the ejector 24. This bypass passage includes the pipes 22*b* and 23*b*. Then, the second injector 23B is provided partway through the bypass passage.

The hydrogen tank 21 contains high pressure hydrogen.

Examples of the shut-off valve 22 include an electromagnetically operated one, and the shut-off valve opens and closes according to a command from the ECU 60.

The first injector 23A and the second injector 23B are electronically controlled by the ECU 60 to intermittently inject hydrogen during ordinary operation. Examples of the injectors include those which can continually inject hydrogen for a short period during high-voltage start-up and those which can continually inject hydrogen (cf. in the second embodiment, only the first injector 23A does so) for a short period depending on the need during start-up.

Note that the first injector 23A, the second injector 23B, the shut-off valve 22, the hydrogen pump 27, a below-described air pump 31, and a back pressure valve 33 are powered by the fuel cell stack 10 and/or a below-described battery 44.

The first injector 23A and the second injector 23B are assemblies in which publicly known components such as a housing, a solenoid, a plunger, a compression coil spring, and a nozzle are combined. Because the first injector 23A and the second injector 23B are electronically controlled by the ECU 60, they respond quickly to a command (e.g., an opening command/a closing command) from the ECU 60 and thus are well controlled.

The ejector 24 includes: a nozzle 24*b* which discharges hydrogen (the first injector 23A-derived hydrogen) to generate a negative pressure; and a diffuser 24*c* which mixes hydrogen and anode off-gas (fuel off-gas) which is sucked through pipes 25*a* and 25*b* by utilizing the above negative pressure to feed the mixed gas to the pipe 24*a* (anode passage 12).

An outlet 12*b* of the anode passage 12 is connected to an intake port of the ejector 24 by way of a pipe 26*a*, the pipe 25*a*, the check valve 25, and the pipe 25*b*. Then, anode off-gas containing unconsumed hydrogen discharged from the anode passage 12 is returned to the ejector 24 (fuel gas inlet passage).

Note that the check valve 25 is to prevent the anode off-gas from flowing backward. In addition, the pipe 26*a* has a gas-liquid separator (not shown) which separates moisture included in the anode off-gas.

The pipe 26*a* is connected to a below-described diluter 34 by way of the purge valve 26 and a pipe 26*b*. The purge valve 26 is opened by the ECU 60 when the inner gas of the anode passage 12 is replaced with hydrogen during the system start-up process and/or when impurities (e.g., water vapor, nitrogen) contained in anode off-gas circulating in a circulation passage (including the anode passage 12 and the pipes 26*a*, 25*a*, 25*b*, and 24*a*) are purged during power generation of the fuel cell stack 10. Note that in this embodiment, the pipes 26*a* and 26*b* constitute the fuel off-gas outlet passage.

The hydrogen pump 27 is a circulator which circulates anode off-gas (fuel off-gas) discharged from the outlet 12*b* of the anode passage 12 by returning the anode off-gas to the inlet 12*a* of the anode passage 12, and is controlled by a command from the ECU 60.

In addition, an inlet port of the hydrogen pump 27 is connected via a pipe 27*a* to the pipe 26*a*, and the pipe 27*a* is connected to the anode off-gas outlet passage upstream of a connecting point between the pipes 26*a* and 25*a*. Further, an outlet port of the hydrogen pump 27 is connected via a pipe 27*b* to the pipe 24*a*, and the pipe 27*b* is connected to the fuel gas inlet passage downstream of a connecting point between the pipes 24*a* and 23*b*.

The pressure sensor 28 is installed in the pipe 24*a* near the inlet 12*a* of the anode passage 12. In addition, the pressure sensor 28 detects an anode pressure Pa (i.e., approximately equal to a pressure in the anode passage 12) inside the pipe 24*a*, and outputs the value to the ECU 60. Note that the pressure sensor 28 may be installed in the pipe 26*a* near the outlet 12*b* of the anode passage 12.

The temperature sensor 29 is mounted on the pipe 26*a* near the outlet 12*b* of the anode passage 12. In addition, the temperature sensor 29 detects a temperature of the fuel cell stack 10, and outputs the value to the ECU 60. Note that the temperature sensor 29 is not limited to this embodiment as long as mounted in a position at which the temperature of the fuel cell stack 10 can be detected. Further, it may be mounted on a pipe 32*b* at the outlet side of the cathode passage 13. Furthermore, it may be mounted on a pipe (not shown) at the refrigerant outlet side of a cooling system that cools the fuel cell stack 10. Moreover, it may directly detect a temperature of the fuel cell stack 10.

The cathode system includes: an air pump 31 (an oxidant-gas-supplying unit); a humidifier 32; a back pressure valve 33; a diluter 34; a pressure sensor 35 (an interelectrode-pressure-difference detecting unit); and the like.

An outlet port of the air pump 31 is connected to an inlet of the cathode passage 13 by way of a pipe 31*a*, the humidifier 32, and a pipe 32*a*. In addition, the air pump 31 is actuated by a motor (not shown). When operated by a command from the ECU 60, the air pump 31 takes in oxygen-containing air and supplies the air to the cathode passage 13.

An outlet of the cathode passage 13 is connected to the diluter 34 by way of a pipe 32*b*, the humidifier 32, a pipe 33*a*, the back pressure valve 33, and a pipe 33*b*. Cathode off-gas (oxidant off-gas) from the cathode passage 13 is discharged into the diluter 34.

The humidifier 32 includes a water-permeable hollow fiber membrane (not shown), and this hollow fiber membrane is used to have fresh air sent out from the air pump 31 absorb water included in humid cathode off-gas discharged from the outlet of the cathode passage 13, thereby humidifying the fresh air.

The back pressure valve 33 is such a normally open valve as a butterfly valve, and a back pressure (i.e., a pressure in the cathode passage 13) thereof is controlled by a command from the ECU 60. However, a degree of opening of the back pressure valve 33 is controlled in such a manner that the pressure difference between the anode and the cathode does not become so large as to be unable to regulate a cathode pressure Pc to rise and fall.

The diluter 34 blends the anode off-gas and the cathode off-gas, and is a vessel in which hydrogen contained in the anode off-gas is diluted with the cathode off-gas (dilution gas). The diluter 34 has a dilution space inside thereof. Then, the pipe 34 is used to exhaust the diluted gas out of a vehicle.

The pressure sensor 35 is mounted in the pipe 32*a* near the inlet of the cathode passage 13. In addition, the pressure sensor 35 detects a cathode pressure Pc (i.e., approximately equal to a pressure in the cathode passage 13) inside the pipe 32a, and outputs a pressure to the ECU 60. Note that the pressure sensor 35 may be mounted in the pipe 32b near the outlet of the cathode passage 13.

The power control system includes: a motor 41; a PDU 42 (Power Drive Unit); a power controller 43; a battery 44; a contactor 45; and the like. The motor 41 is connected to an output terminal (not shown) of the fuel cell stack 10 by way of the PDU 42, the power controller 43, and the contactor 45. The battery 44 is connected to the power controller 43. That is, the motor 41 and the battery 44 are connected in parallel to the power controller 43 (fuel cell stack 10).

The motor 41 may be an electric motor that generates driving force to drive a fuel cell vehicle.

The PDU 42 may be an inverter that converts direct-current power from the power controller 43 into three-phase alternating-current power to supply the converted power to the motor 41.

The power controller 43 operates according to directions by the ECU 60, having a function to control outputs (e.g., generated power, a current value, a voltage value) of the fuel cell stack 10 and a function to control discharge and charge of the battery 44. Such a power controller 43 includes various electronic circuits such as a DC-DC chopper circuit.

The battery 44 is an accumulator battery that can be charged and discharged, and is made of a battery pack constituted by, for example, a plurality of lithium-ion cells that are combined.

The contactor 45 is disposed between the fuel cell stack 10 and the power controller 43, and includes a switch that connects/disconnects the fuel cell stack 10 with an external load (e.g., the motor 41, the battery 44). The switch is turned on and off by the ECU 60.

An IG 51 is a start switch for the fuel cell system 1 (a fuel cell vehicle) and is disposed in the vicinity of a driver seat. In addition, the ECU 60 is connected to the IG 51 and is able to detect an ON-signal (a system start signal) and an OFF-signal (a system stop signal) of the IG 51.

A timer 52 is to measure a power generation down time of the fuel cell stack 10 (i.e., a down time; a down time before the start-up of the fuel cell stack 10) by detecting a time from detection of an OFF-signal to detection of an ON-signal of the IG 51. The timer 52 outputs the measured power generation down time to the ECU 60.

The ECU 60 is a control device that electronically controls the fuel cell system 1, including a CPU (Central Processing Unit), a ROM (Read Only Memory), a RAM (Random Access Memory), various interfaces, electronic circuits, and the like. Built-in programs are used to control various units and to execute various processes.

Figure 2A:
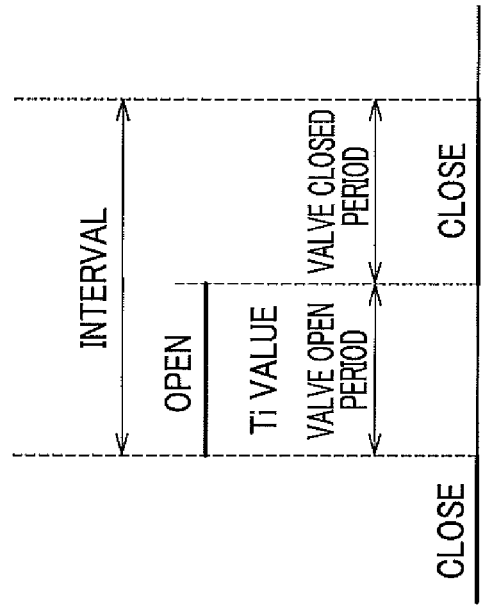
FIG. 2A is a waveform diagram illustrating a relationship between an interval and a valve open period during high-voltage start-up.
Figure 2B:
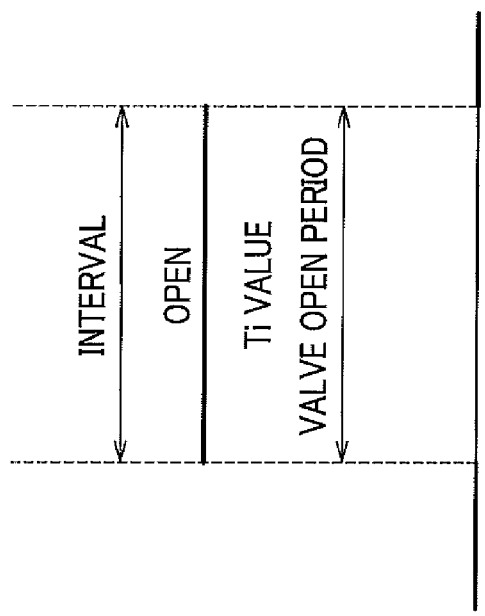
FIG. 2B is a waveform diagram illustrating a relationship between an interval and a valve open period during ordinary power generation.

In addition, the ECU 60 has a function to control the first injector 23A and the second injector 23B on PMW (Pulse Width Modulation). Specifically, as illustrated in FIGS. 2A and 2B, the ECU 60 changes a ratio of an opening time of each of the first injector 23A and the second injector 23B (i.e., a valve open period [Ti value]; ON duty) to an interval which corresponds to a of the injector valve operation (i.e., an interval from a time of opening a valve to a time of next opening the valve; a reference period; a drive period). Accordingly, the ECU 60 has a function to regulate a hydrogen injection volume (i.e., a flow volume) from each of the first injector 23A and the second injector 23B and to regulate a hydrogen flow volume (i.e., a total flow volume) supplied to the anode passage 12.

FIG. 2A depicts below-described control of the first injector 23A during a high-voltage start-up process of the fuel cell stack 10, and illustrates the case where a Ti value (a valve open period) is equal to the interval. This configuration makes it possible to continuously supply hydrogen. Note that this condition corresponds to a condition in which a valve of the first injector 23A remains open. Also note that as for the second injector 23A, a Ti value (i.e., a valve open period) is set to be shorter than the interval to control its opening and closing. This control makes it possible to periodically supply hydrogen. The reason why a valve of the second injector 23B is not continuously opened in this embodiment is to prevent an anode pressure from becoming an excessively high level.

FIG. 2B depicts control of the first injector 23A and the second injector 23B during ordinary power generation, and illustrates a case where the interval is longer than the Ti value (the valve open period). This configuration makes it possible to periodically supply hydrogen.

In addition, the ECU 60 measures a power generation down time T of the fuel cell stack 10 after detection of an ON-signal of the IG 51 (i.e., after initiation of start-up of the fuel cell stack 10). When the power generation down time T is determined to be equal to or more than a predetermined period (by an anode-passage-gas-replacement-determining unit), the high-pressure-fuel-gas-supply-controlling unit controls the first injector 23A and the second injector 23B to make an anode pressure Pa (i.e., a target pressure) become higher than when the power generation down time T is determined shorter than the predetermined period.

Figure 3A:
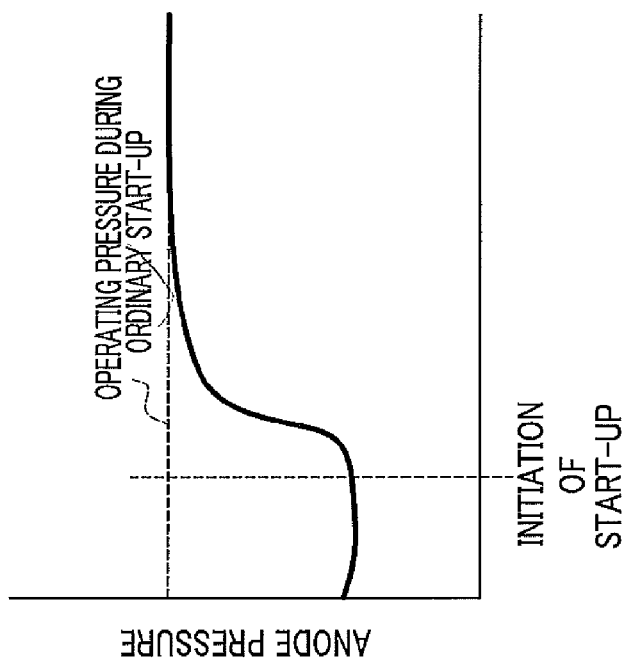
FIG. 3A is a graph illustrating an example of how an anode pressure behaves during high-voltage start-up.

Specifically, as illustrated in FIG. 3A, when the power generation down time T is equal to or more than the predetermined period, the total injection volume of the first injector 23A and the second injector 23B is made to increase. Accordingly, the target pressure (i.e., an operating pressure during high-voltage start-up) is set to be higher than an operation pressure during ordinary start-up illustrated in FIG. 3B (i.e., in the case where the power generation down time T is less than the predetermined period). For example, the Ti values (i.e., valve open periods, injection volumes) of the first injector 23A and the second injector 23B are set to be higher than those during ordinary power generation illustrated in FIG. 2B, so that the anode pressure Pa (i.e., the target pressure) can be increased.

Figure 4A:
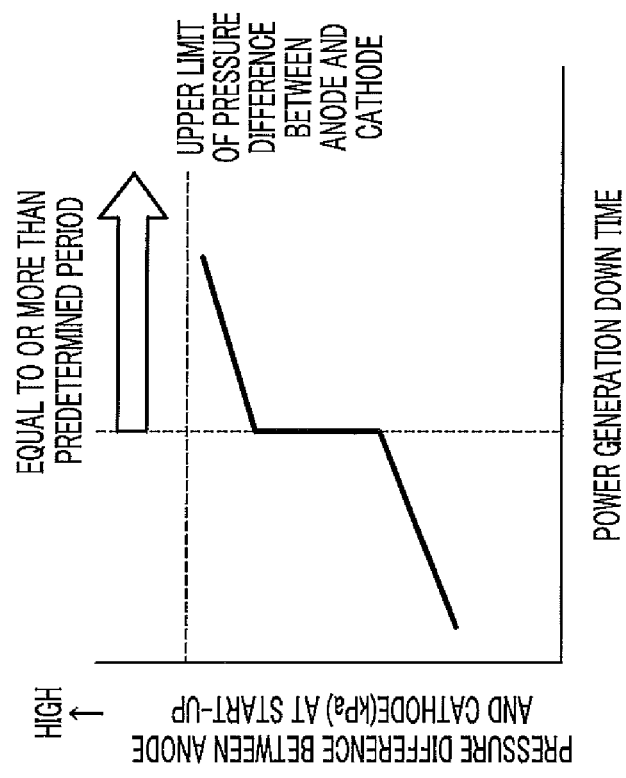
FIG. 4A is a map indicating a relationship between an anode pressure during start-up and a power generation down time.

In addition, as illustrated in FIG. 4A, the target pressure (i.e., the anode pressure Pa) during start-up when the power generation down time T is equal to or more than the predetermined period is set to be higher than when the power generation down time T is less than the predetermined period. Note that the case where a power generation down time T is equal to or more than a predetermined period refers to a condition in which the anode passage 12 and the cathode passage 13 each have air; when the fuel cell stack 10 is started to supply hydrogen from the inlet 12a of the anode passage 12, a hydrogen concentration difference (i.e., the inlet 12a side has a high level and the outlet 12b side has a low level) between the inlet 12a side and the outlet 12b side of the anode passage 12 is generated; and the fuel cell stack 10 thus becomes polarized at a high potential. Also note that the target pressure may be a fixed value or the target pressure (i.e., the anode pressure) during start-up may be increased as the power generation down time becomes longer.

Figure 4B:
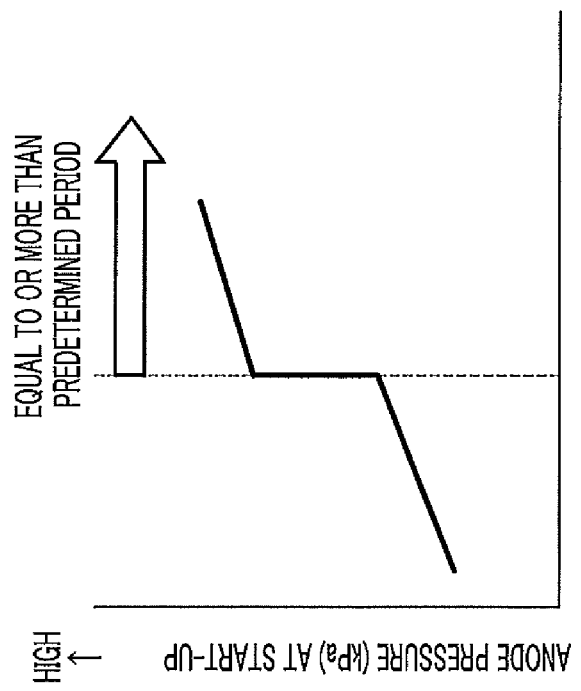
FIG. 4B is a map indicating a relationship between a pressure difference between the anode and the cathode during start-up and a power generation down time.

In addition, as illustrated in FIG. 4B, if the power generation down time T is equal to or more than the predetermined period, the pressure difference between the anode and the cathode at the time of the fuel sell system starting may be taken into consideration when determining the target pressure (i.e., the anode pressure). Further, the pressure difference between the anode and the cathode corresponds to a pressure difference (Pa−Pc) between an anode pressure Pa at the inlet 12a side of the anode passage 12, which is detected with the pressure sensor 28, and a cathode pressure Pc at the inlet 13a side of the cathode passage 13, which is detected with the pressure sensor 35. Furthermore, when the power generation down time T is equal to or more than the predetermined period, the higher anode pressure Pa during the start-up process may be set to make the pressure difference between the anode and the cathode larger, as the power generation down time T becomes longer. Moreover, an upper limit (i.e., a pressure difference at and below which an electrolyte membrane is not damaged) of the pressure difference between the anode and the cathode may be taken into account for determination.

First Embodiment

Figure 5:
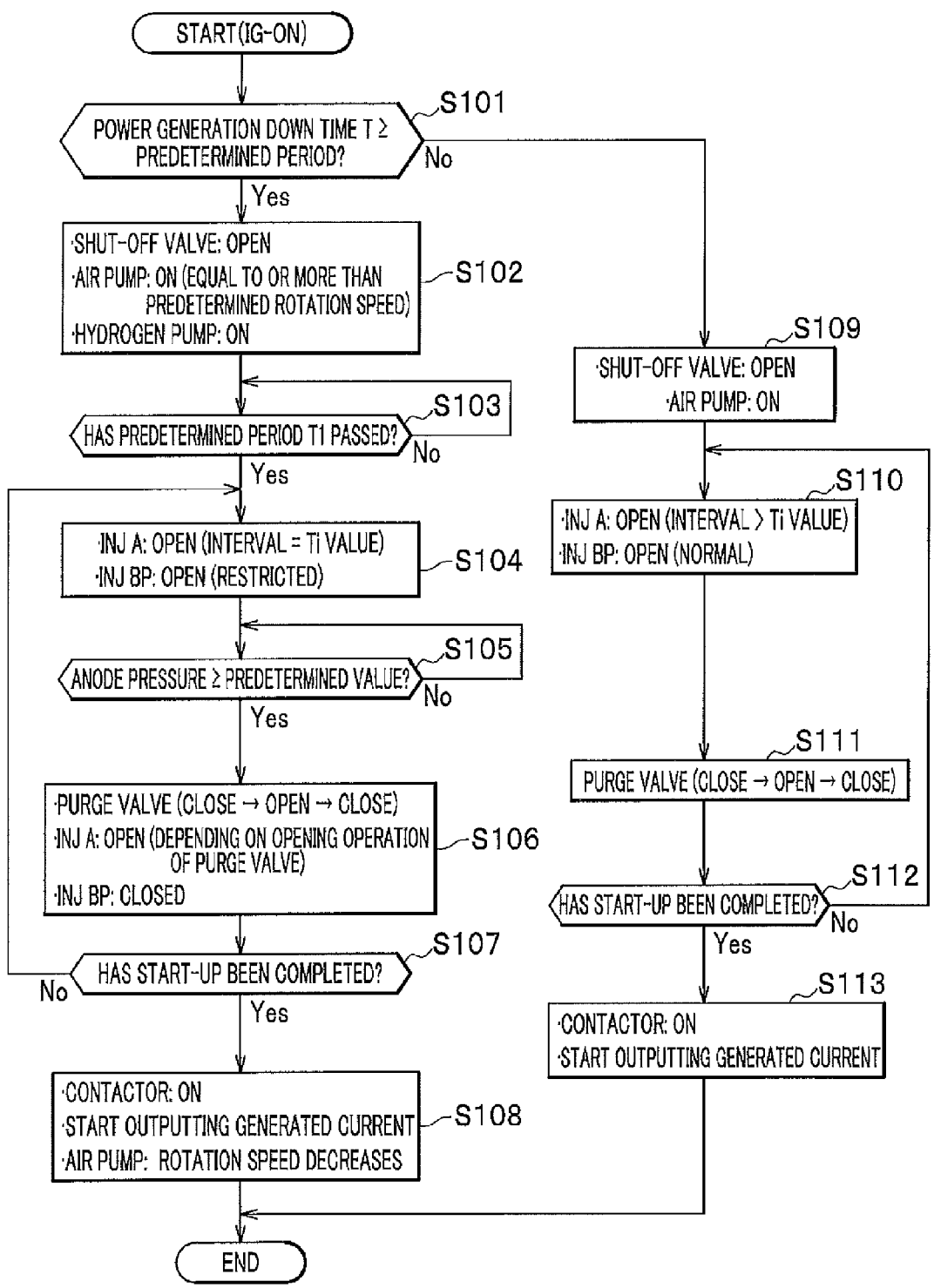
FIG. 5 is a flow chart illustrating how a fuel cell system according to the first embodiment works.
Figure 6A:
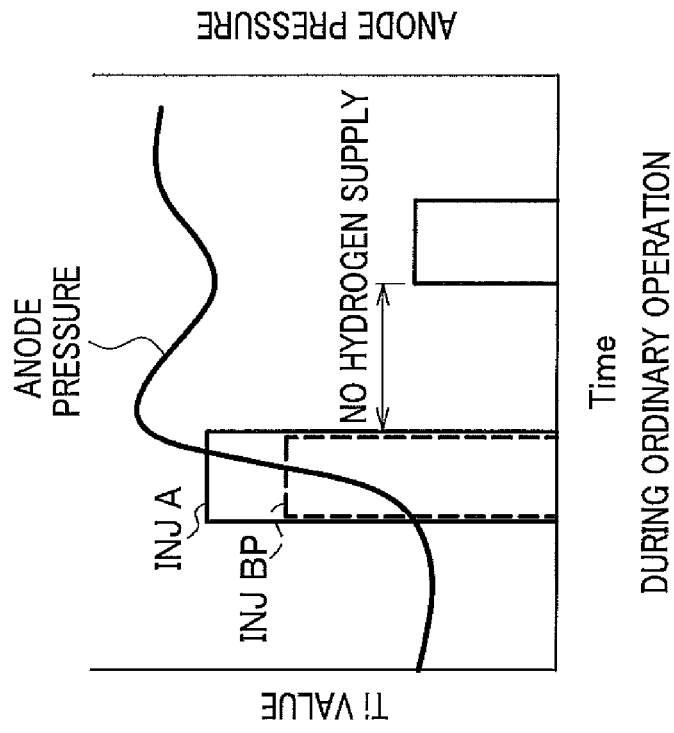
FIG. 6A is a graph illustrating a relationship among a target pressure during high-voltage start-up, a valve open period of an injector, and an anode pressure.
Figure 6B:
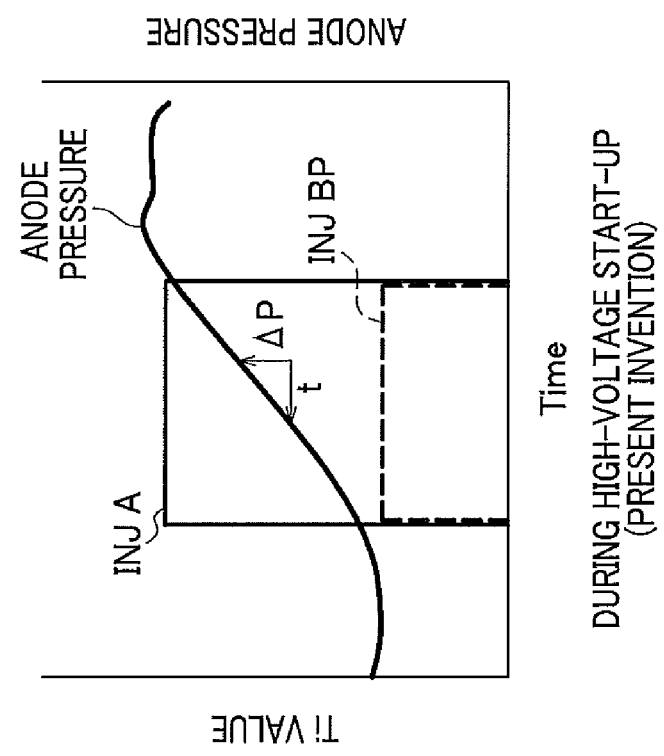
FIG. 6B is a graph illustrating a relationship among a target pressure during ordinary start-up, a valve open period of an injector, and an anode pressure.
Figure 7:
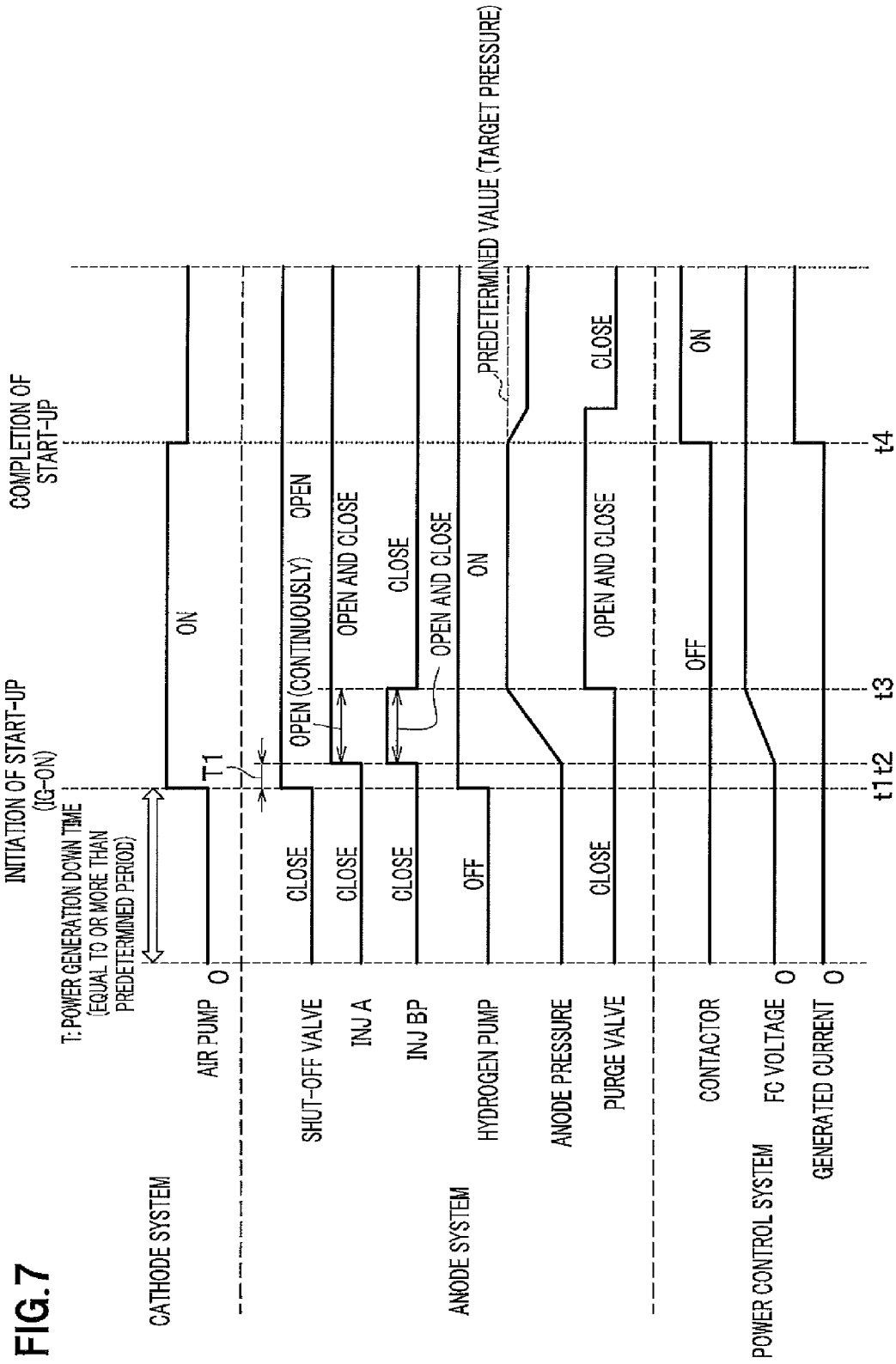
FIG. 7 is a time chart illustrating an example of how to operate a fuel cell system according to the first embodiment.

The following describes operation of the fuel cell system 1 by referring to FIGS. 5 to 7.

Note that when operation of the fuel cell system 1 is halted (at the time of IG-OFF), a supply of hydrogen and air to the fuel cell stack 10 is ceased, so that power generation of the fuel cell stack 10 is stopped. Also, during a power generation down time, the purge valve 26 is closed and the back pressure valve 33 is open. Accordingly, during the power generation down time, for example, a passage including the anode passage 12 is hermetically sealed. In this state, air remaining in the cathode passage 13 permeates through an electrolyte membrane to the anode passage 12. Then, the inner gas of the anode passage 12 is gradually replaced with the air.

As illustrated in FIG. 5, when an ON-signal of the IG 51 (i.e., a system start signal) is detected, the ECU 60 determines at Step S101 whether or not a power generation down time T, which has been measured using the timer 52, is equal to or more than a predetermined period. Note that what is meant by "equal to or more than a predetermined period" is a condition in which the inner gas of the anode passage 12 are replaced with air; when the fuel cell stack 10 is started at the next time to supply hydrogen to the anode passage 12, a hydrogen concentration difference between the inlet 12a side and the outlet 12b side of the anode passage 12 is generated; and the fuel cell stack 10 is polarized at a high potential.

At Step S101, when the ECU 60 determines that the power generation down time T is equal to or more than the predetermined period (i.e., Yes), the process goes to Step S102. When the ECU 60 determines that the power generation down time T is less than the predetermined period (i.e., No), the process goes to S109.

At Step S102, the ECU 60 opens the shut-off valve 22 and actuates (turns on) the air pump 31 to supply air into the cathode passage 13. Note that at this moment, both the first injector 23A and the second injector 23B are closed. Accordingly the hydrogen in the tank 21 flows through the pressure-reducing valve (not shown) through which a pressure of the hydrogen is reduced and further flows up to the first injector 23A and the second injector 23B.

In addition, at Step S102, the air pump is made to operate at a predetermined rotation speed or higher (i.e., higher than when the power is ordinarily generated). The reason why an amount of the air supplied is increased in such a manner is to dilute hydrogen contained in anode off-gas discharged from the anode passage 12 when the purge valve 26 is opened at Step S106 as described below.

Further, at Step S102, the ECU 60 starts (turns on) to have the hydrogen pump 27 in operation (i.e., by using a circulator-operation-starting unit). Since the hydrogen pump 27 is actuated, gas (primarily, air) circulates within the anode circulation system (including the anode passage 12, part of the pipe 26a, the pipes 27a and 27b, and part of the pipe 24a).

Next, the process goes to Step S103, and the ECU 60 determines whether or not a predetermined period T1 has elapsed. Note that the predetermined period T1 may be a period to achieve a state in which gas circulates within the anode circulation system (including the anode passage 12 and passages within the pipes 26a, 27a, 27b, and 24a). In other words, the period is defined so as to be able to immediately circulate hydrogen within the anode circulation system when the hydrogen is supplied from the first injector 23A and the second injector 23B. Note that the predetermined period is determined based on a prior test, etc.

At Step S103, when the ECU 60 determines that the predetermined period has passed (i.e., Yes), the process goes to Step S104. When the ECU 60 determines that the predetermined period has not passed (i.e., No), the process of Step S103 is repeated.

At Step S104, the ECU 60 opens the valve of each of the first injector 23A and the second injector 23B. At that occasion, the Ti value of the first injector 23A is made to increase, so that its injection volume becomes larger than that during ordinary power generation (see FIG. 3A). This setting makes it possible to elevate a target pressure (i.e., an anode pressure Pa) of hydrogen supplied to the anode passage 12, compared with that during the ordinary power generation.

In addition, at Step S104, the ECU 60 continuously opens the valve of the first injector 23A by setting the Ti value (i.e., the valve open period) of the first injector 23A equal to the interval (see FIG. 2A). Further, as for the second injector 23B, the ECU 60 periodically opens the second injector 23B by setting the Ti value (i.e., the valve open period) to be shorter than the interval. Note that the injection volume (i.e., the Ti value) of the second injector 23B is appropriately limited when a pressure increase becomes too large as described below. Furthermore, as for the first injector 23A, the setting is not limited to a condition in which the valve is continually open. The setting is allowed as long as the valve open period is longer than that during ordinary power generation (see FIG. 2B).

With reference to FIG. 6A, 6B, the following describes why the injection volume (i.e., the Ti value) of the second injector 23B is restricted. FIG. 6A is a graph (this embodiment) illustrating a relationship between a target pressure during high-voltage start-up and a valve open period of an injector. FIG. 6B is a graph (comparative example) illustrating a relationship between a target pressure during ordinary start-up and a valve open period of an injector.

Specifically, as illustrated in FIG. 6B, when the first injector 23A (INJ A) and the second injector 23B (INJ BP) are each used under a fully open condition, an increase (i.e., an increase per unit time) in an anode pressure Pa becomes too large, so that the anode pressure immediately reaches a target pressure. Accordingly, a hydrogen supply from the first injector 23A and the second injector 23B is rapidly stopped. The termination of the hydrogen supply causes a state, in which a hydrogen concentration difference between the inlet 12a side and the outlet 12b side of the anode passage 12 is generated, to remain until the next hydrogen injection from the first injector 23A and the second injector 23B begin. Consequently, the fuel cell stack 10 is kept polarized at a high potential until the operation restarts.

In this regard, however, when the power is ordinarily generated, a larger increase in the anode pressure Pa is preferable as illustrated in FIG. 6B. This is because as the increase becomes large, responsiveness can be enhanced when a fuel cell vehicle, for example, is accelerated.

Here, in this embodiment, the Ti value (i.e., the valve open period, the injection volume) of the second injector 23B (INJ BP) is restricted as illustrated in FIG. 6A. As a result, an increase (i.e., an increase per unit time [ΔP/t]) in the anode pressure Pa is suppressed. This setting can thus prevent hydrogen from being intermittently supplied because operation of the first injector 23A and the second injector 23B is stopped at an earlier time point. Consequently, hydrogen can be continuously supplied to the anode passage 12, and can therefore quickly decrease the hydrogen concentration difference generated between the inlet 12a side and the outlet 12b side of the anode passage 12.

Figure 8:
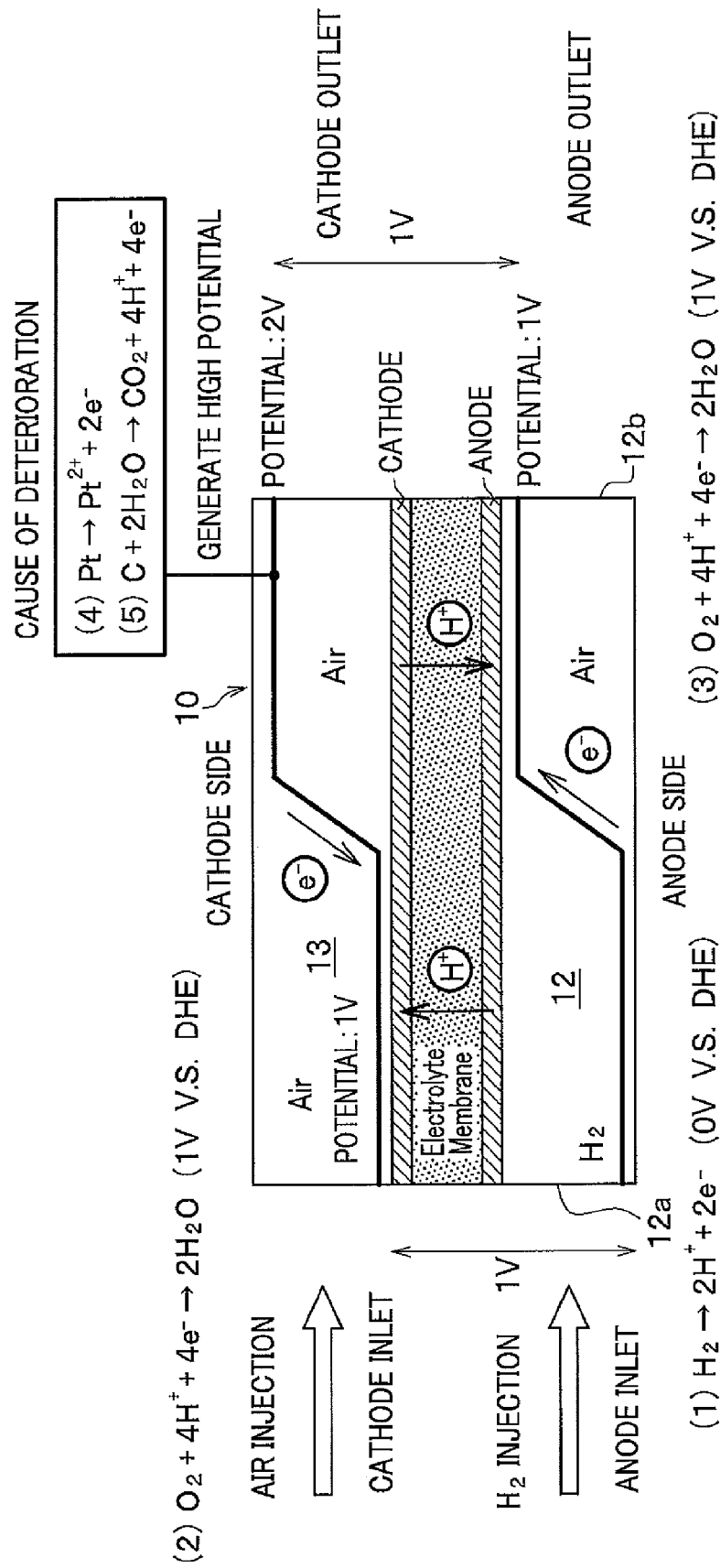
FIG. 8 is a schematic diagram for describing a high potential polarization condition of a fuel cell during its start-up.

With reference to FIG. 8, the following details a mechanism by which a hydrogen concentration difference between the inlet 12a side and the outlet 12b side of the anode passage 12 causes the fuel cell stack 10 to be polarized at a high potential.

When the anode passage 12 and the cathode passage 13 of the fuel cell stack 10 each have air therein during the start-up process (i.e., when a power generation down time is equal to or more than a predetermined period) as illustrated in FIG. 8, a hydrogen injection from the inlet 12a of the anode passage 12 causes a hydrogen concentration in the inlet 12a side of the anode passage to increase and causes a hydrogen concentration in the outlet 12b side of the anode passage 12 to be low at an initial stage of the hydrogen injection.

Consequently, as illustrated in equation (1), electrons dissociate from hydrogen at the inlet 12a side of the anode passage 12; hydrogen ions permeate through an electrolyte membrane to the inlet side of the cathode passage 13; and the electrons move toward the outlet 12b side of the anode passage 12. At that moment, a potential at the inlet 12a side of the anode passage 12 is 0 volt relative to a DHE (Dynamic Hydrogen Electrode).

In addition, as illustrated in equation (2), hydrogen ions and electrons react with oxygen in air at the inlet side to produce water at the inlet side of the cathode passage 13. At that moment, a potential of the inlet side of the cathode passage 13 is about 1 volt relative to the DHE.

Also, as illustrated in equation (3), water is produced at the outlet 12b side of the anode passage 12 by reacting oxygen at the outlet 12b side of the anode passage 12 with hydrogen ions that permeate through the electrolyte membrane from the outlet side of the cathode passage 13 and the electrons that are transferred from the inlet 12a side of the anode passage 12. At that time, a potential of the outlet 12b side of the anode passage 12 is about 1 volt relative to the DHE.

Further, as illustrated in equation (4), at the outlet side of the cathode passage 13, electrons dissociate from a catalyst (platinum) that is used for a cathode (an electrode), and platinum ions are produced. Furthermore, as illustrated in equation (5), carbon contained in the cathode (electrode) react with the generated water that has permeated through the electrolyte membrane from the outlet 12b side of the anode passage or the generated water that has been transferred from the inlet side of the cathode passage 13. Then, carbon dioxide and hydrogen ions are produced. At that time, the electrons move to the inlet side of the cathode passage 13.

As is explained above, a potential difference of 1 volt is generated over the inlet portion of the fuel cell stack 10 and a potential difference of 1 volt over the outlet portion of the fuel cell stack 10. Consequently, a potential of the outlet side of the cathode passage 13 is 2 volt relative to the DHE. This causes the fuel cell stack 10 to be subject to a high potential polarized condition. If the reaction (i.e., a reaction to promote catalyst erosion) expressed in equation (4) and the reaction expressed in equation (5) continue to progress for a long period, that is, if a hydrogen concentration difference between the inlet 12a side and the outlet 12b side of the anode passage 12 lasts for a long period, the fuel cell stack 10 is continuously subject to the high potential polarized condition and deteriorates. Accordingly, the above explained state of the fuel cell stack 10 is then responsible for the deterioration of the fuel cell stack 10. According to these findings, it is critical how quickly the hydrogen concentration difference between the inlet 12a side and the outlet 12b side of the anode passage 12 can be reduced.

Now, back to FIG. 5, The process goes to Step S105, and the ECU 60 then determines whether or not an anode pressure Pa that has been detected with the pressure sensor 28 is equal to or more than a predetermined value. Note that the predetermined value (i.e., a target pressure) is set to be a pressure required for reducing the hydrogen concentration difference between the inlet 12a side and the outlet 12b side of the anode passage 12. In addition, the predetermined period is determined based on a prior test, etc. It is also noted that the above configuration is not limited to a configuration in which the ECU 60 determines the situation by using a value detected with the pressure sensor 28. However, the ECU 60 may determine the situation based on a period (from t2 to t3) required to increase the pressure up to the predetermined value.

At Step S105, when the ECU 60 determines that the anode pressure Pa is less than the predetermined value (i.e., No), the process of Step S105 is repeated. When the ECU 60 determines that the anode pressure Pa is equal to or more than the predetermined value (i.e., Yes), the process goes to S106.

At Step S106, the ECU 60 starts opening and closing control of the purge valve 26. Note that the reason why the opening and closing control of the purge valve 26 starts after initiation of operation of the first injector 23A and the second injector 23B is to reduce the hydrogen concentration difference between the inlet 12a side and the outlet 12b side of the anode passage 12 at an earlier time point by quickly increasing the anode pressure Pa in the anode passage 12. In addition, even if the purge valve 26 is opened at this step, highly concentrated hydrogen is not emitted outside a vehicle because an operating pressure of the air pump 31 is higher than that during ordinary power generation (see Step S102).

Also, at Step S106, the ECU 60 switches the operation of the first injector 23A from continuous valve-opening operation to valve-opening control that depends on the opening operation of the purge valve 26, and closes the valve of the second injector 23B. That is, the ECU 60 controls the opening and closing (i.e., controls the Ti value) of the valve of the first injector 23A in such a way that an amount (volume) of hydrogen that is equal to an amount of the gas discharged from through the purge valve 26 while it is open is injected through the injector 23A.

Next, the process goes to Step S107, and the ECU 60 determines whether or not the start-up has been completed. The case where the start-up has been completed refers to a case where the ECU 60 determines that a predetermined volume of gas has been purged (exhausted) since the opening (opening and closing) of the purge valve 26. Whether or not the predetermined volume of gas has been purged can be determined based on, for example, a valve open period of the purge valve 26.

At Step S107, when the ECU 60 determines that the start-up has not been completed (i.e., No), the process returns to Step S104. When the ECU 60 determines that the start-up has been completed (i.e., Yes), the process goes to Step S108.

At step S108, the ECU 60 turns on the contactor 45 (i.e., connects the fuel cell stack 10 to the external load), and starts collecting a generated current from the fuel cell stack 10 and lowers a rotation speed of the air pump 31 to a rotation speed necessary for ordinary power generation. The generated current collected from the fuel cell stack 10 is supplied to the external load such as the motor 41 and the air pump 31. In addition, the ECU 60 controls the opening and closing (the Ti value) of the first injector 23A in accordance with how large the generated current collected from the fuel cell stack 10 should be.

By the way, at Step S101, when the ECU 60 determines that the power generation down time T is less than the predetermined period (i.e., No), the process goes to Step S109. The ECU 60 opens the shut-off valve 22 and turns on the air pump 31 (i.e., sets its rotation speed to a speed during ordinary start-up).

Then, the process goes to Step S110, and the ECU 60 opens the valve of each of the first injector 23A and the second injector 23B. At that time, the injection volumes (i.e., the Ti values) of the first injector 23A and the second injector 23B are set to be lower (smaller) than those of Step S104.

Further, at Step S110, the ECU 60 sets the Ti value (i.e., the valve open period) of the first injector 23A to be shorter than the interval, and intermittently opens the valve of the first injector 23A. Furthermore, as for the second injector 23B, the ECU 60 likewise sets its Ti value (i.e., the valve open period) to be shorter than the interval, and intermittently opens the valve of the second injector 23B.

Then, the process goes to Step S111, and the ECU 60 starts controlling the opening and closing of the purge valve 26 in a manner similar to the above Step S106. In this case, the ECU 60 immediately starts controlling the opening and closing of the purge valve 26 to replace the inner gas of the anode passage 12 with hydrogen without waiting for the anode pressure to exceed the predetermined value after the valves of the first injector 23A and the second injector 23B are opened.

Next, the process goes to Step S112, and the ECU 60 determines whether or not the start-up has been completed. At Step S112, when the ECU 60 determines that the start-up has not been completed (i.e., No), the process returns to Step S110. When the ECU 60 determines that the start-up has been completed (i.e., Yes), the process goes to Step S113.

At step S113, the ECU 60 turns on the contactor 45 (i.e., connects the fuel cell stack 10 to the external load), and starts to have the fuel cell stack 10 output a generated current.

Meanwhile, the time chart illustrated in FIG. 7 is referred to for description. At time t1, a start signal (ON-signal) of the IG 51 is detected. At that time, when the power generation down time T is equal to or more than the predetermined period (i.e., S101, Yes), the ECU 60 opens the shut-off valve 22 and starts operating the air pump 31 and the hydrogen pump 27 (S102).

Next, at time t2 when a predetermined period T1 has passed since the time t1, the ECU 60 continuously opens the valve of the first injector 23A (INJ A) and periodically opens the valve of the second injector 23B (INJ BP). By doing so, the anode pressure Pa starts to increase and the voltage of the fuel cell stack 10 (i.e., the FC voltage) also starts to become higher.

Then, at time t3 when the anode pressure Pa reaches a predetermined value (i.e., a target pressure), the ECU 60 starts controlling the opening and closing of the purge valve 26 (i.e., at Step S105, Yes; Step S106). Note that even if the purge valve 26 is opened after the initiation of the opening of the valves of the first injector 23A and the second injector 23B, highly concentrated hydrogen (with a predetermined concentration) is not going to be emitted outside a fuel cell vehicle because the rotation speed of the air pump 31 is set to be higher than that during ordinary start-up.

In addition, after the time t3, the purge valve 26 is opened and closed so as to replace air in the anode passage 12 with hydrogen, so that gas is purged from the anode circulation system including the anode passage 12. Then, the first injector 23A is opened and closed depending on the amount purged to periodically supply hydrogen to the anode passage 12. Note that at the time t3, the second injector 23B is closed, which stops a hydrogen supply from the second injector 23B.

After that, at time t4, a predetermined period has passed since the ECU 60 has started controlling the opening and closing of the purge valve 26, and the ECU 60 determines that the start-up has been completed (i.e., at Step S107, Yes). At that time, the contactor 45 is turned on, and the process enters ordinary power generation during which the generated current is collected from the fuel cell stack 10 (i.e., Step S108). Note that during the ordinary power generation after completion of the start-up process, the opening and closing of the valve is controlled depending on the generated current to be outputted, and hydrogen is periodically supplied.

Figure 3B:
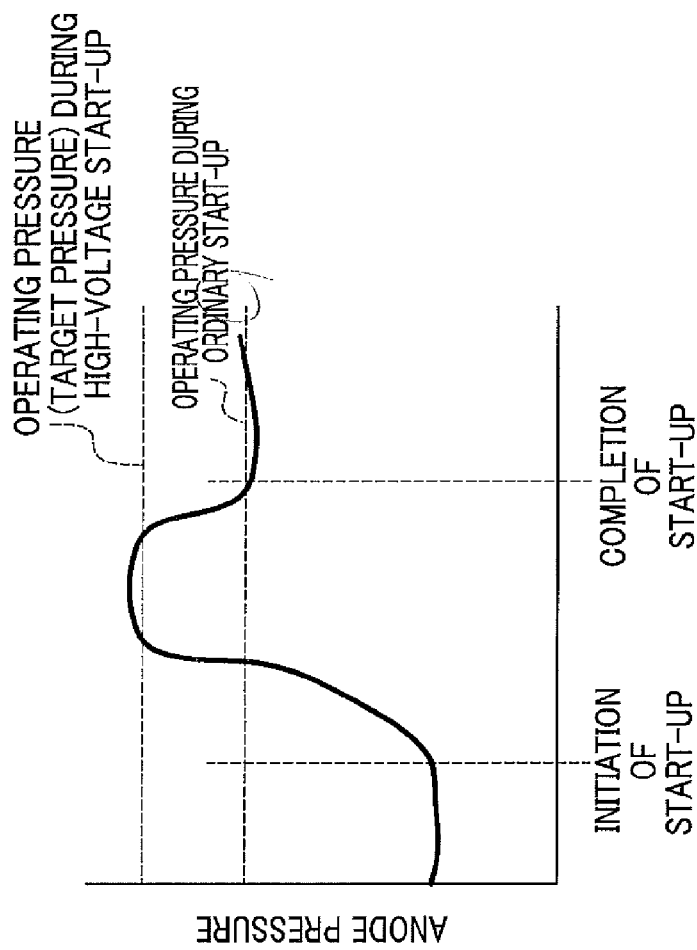
FIG. 3B is a graph illustrating an example of how an anode pressure behaves during ordinary start-up.

As described above, in the fuel cell system 1 according to this embodiment, when the ECU 60 determines that the power generation down time T is equal to or more than the predetermined period, the target pressure (i.e., the anode pressure Pa) at the start-up of the fuel cell stack 10 (at the time of IG-ON) is set to be higher for supply (see FIG. 3A) than that when the power generation down time T is less than the predetermined period (see FIG. 3B). This setting makes it possible to promote mixture of air (oxidant gas) and hydrogen (fuel gas) in the anode passage 12. This setting can also prevent the fuel cell stack 10 from being polarized at a high potential for a long time, thereby capable of reducing deterioration of the fuel cell stack 10.

That is, the target pressure (i.e., the anode pressure) is set to be higher than that during ordinary start-up. As a result, the hydrogen concentration difference between the inlet 12a side and the outlet 12b side of the anode passage 12 is quickly reduced. Consequently, this setting can prevent the fuel cell stack 10 from being polarized at a high potential for a long time.

In addition, in this embodiment, as the power generation down time T of the fuel cell stack 10 becomes longer, the target pressure is set to be higher. This circumvents the need to set the target pressure to be unnecessarily (wastefully) high. As a result, there is no need to unnecessarily (wastefully) operate the first injector 23A and the second injector 23B, which can reduce power consumption.

Also, in this embodiment, the pressure increase in the anode pressure Pa is set to be lower (see FIG. 6A) than that during ordinary power generation (see FIG. 6B). This setting can prevent a hydrogen supply from being intermittent during start-up of the fuel cell stack 10, thereby promoting the mixture of the hydrogen and the air. Promoting the mixture of the air and the hydrogen can quickly reduce the hydrogen concentration difference between the inlet 12a side and the outlet 12b side of the anode passage 12, which can prevent the fuel cell from being kept polarized at a high potential for a long time.

Further, in this embodiment, the ECU 60 starts operating the hydrogen pump 27 (a circulator) before the first injector 23A and the second injector 23B are actuated (i.e., before execution of the process using a high-pressure-fuel-gas-supply-controlling unit). This operation has the hydrogen supply start after a gas (primarily, air) flow has been established in the anode circulation system (e.g., the connection passages 27a and 27b, the pipes 24a and 26a), thereby further promoting the mixture of the air and the hydrogen. Accordingly, this setting can rapidly offset the hydrogen concentration difference between the inlet 12a side and the outlet 12b side of the anode passage 12, which can definitely prevent the fuel cell from being polarized at a high potential for a long time.

Furthermore, in this embodiment, an electronically-controlled injector can be used as the fuel-gas-pressure-adjusting-and-supplying unit, so that more precise control can be carried out.

Moreover, in this embodiment, while maintaining the open valve conditions of the first injector 23A and the second injector 23B, the ECU 60 can continually supply hydrogen, thereby further facilitating the mixture using hydrogen as a substitute for air. Accordingly, this setting can rapidly offset the hydrogen concentration difference between the inlet 12a side and the outlet 12b side of the anode passage 12, which can certainly prevent the fuel cell from being kept polarized at a high potential for a long time.

The present invention is not limited to the above embodiment, and may be appropriately modified within an extent not departing from the scope of the present invention. The first embodiment is used to describe, as an example, the case where the power generation down time T is determined to be equal to or more than the predetermined period as a condition under which a process for increasing a target pressure is executed during start-up of the fuel cell stack 10. The condition is not limited to the above case. The case may be determined based on whether or not air (oxidant gas) is used to scavenge the anode passage 12 during the power generation down time (i.e., at the time of IG-OFF).

Specifically, although the depiction is omitted, the system may include: an inlet pipe which leads air (oxidant gas) by connecting the pipes 31a and 24a; and an inlet shut-off valve which blocks this inlet pipe. The inlet shut-off valve and the purge valve 26 are open during the power generation down time. Then, the inlet pipe is used to inject air from the air pump 31 into passages including the anode passage 12 to scavenge the passages. As a result, the inner gas of the anode passage 12 is replaced with the air. Accordingly, when the anode passage is scavenged in such a manner, a process for increasing a target pressure (i.e., an anode pressure Pa) is executed during start-up of the fuel cell stack 10. This process can prevent the fuel cell stack 10 from being polarized at a high potential for a long time.

Meanwhile, the first embodiment is used to describe, as an example, the case where both the first injector 23A and the second injector 23B are operated at Step S104. However, either the first injector 23A or the second injector 23B may be actuated while the other is stopped.

In addition, the first embodiment is used to describe, as an example, the case where in control of the first injector 23A and the second injector 23B, the interval remains constant and the Ti value (i.e., the valve open period) is modified. The cases are not limited to the above case, and the Ti value (i.e., the valve open period) may be kept constant and the interval may be modified.

Second Embodiment

Figure 9:
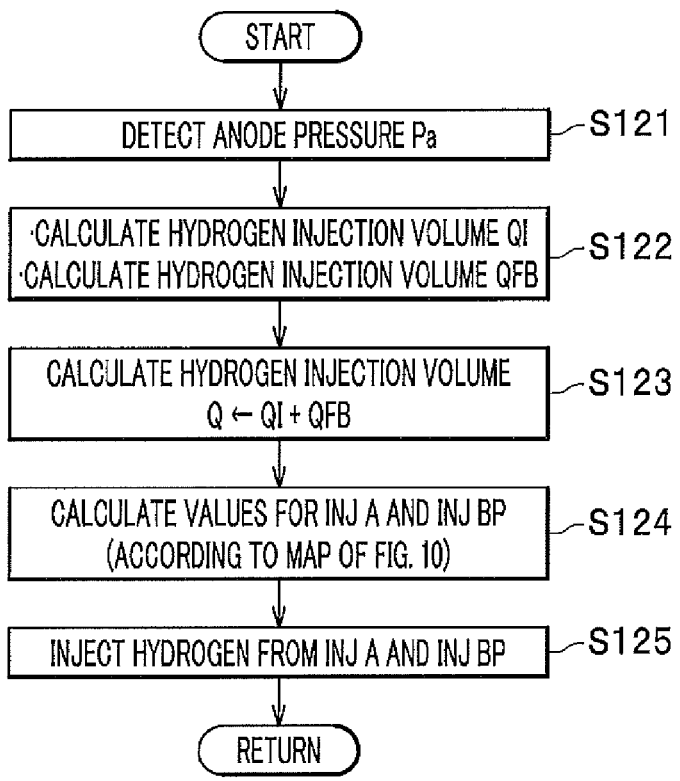
FIG. 9 is a flow chart illustrating operation when the power is ordinarily generated.
Figure 10:
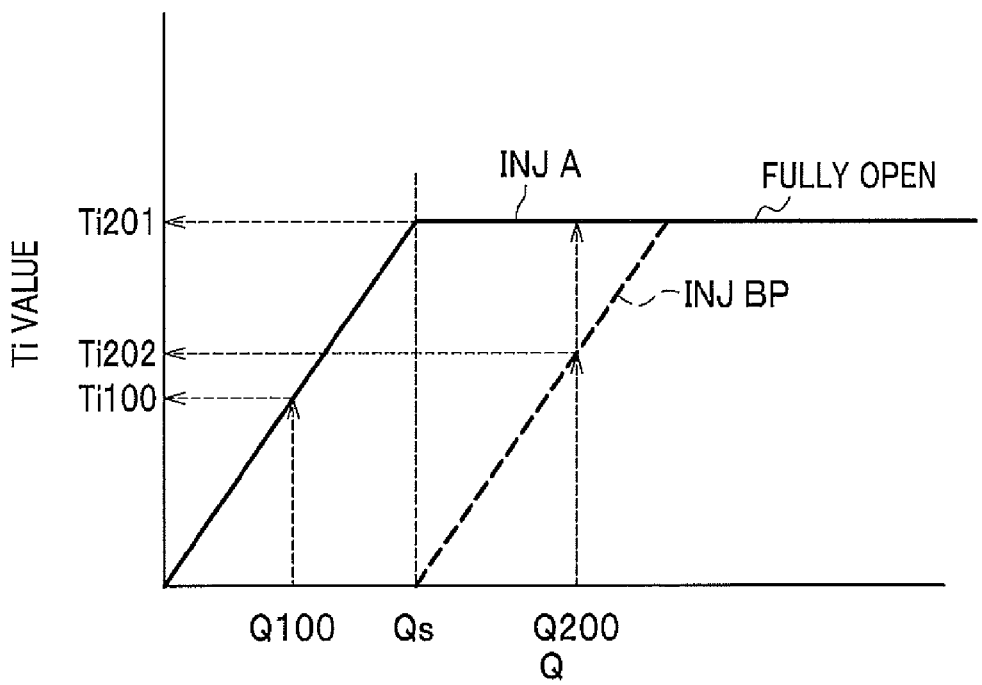
FIG. 10 is a map indicating a relationship between a hydrogen injection volume and a Ti value (a valve open period).

The following describes operation of the fuel cell system 1 by referring to FIGS. 9 to 15. First, FIGS. 9 and 10 are used to describe operation (i.e., operation with feedback control) during ordinary power generation of the fuel cell stack 10. Next, FIGS. 11 to 15 are used to describe operation (i.e., operation without the feedback control) during start-up of the fuel cell stack 10.

As illustrated in FIG. 9, at Step S121, the ECU 60 detects a pressure (i.e., an anode pressure) Pa of the anode passage 12 by using the pressure sensor 28.

Subsequently, the process goes to Step S122, and the ECU 60 calculates each of a hydrogen injection volume QI and a hydrogen injection volume QFB. Note that the hydrogen injection volume QI is calculated based on a generated current in the fuel cell stack 10. That is, the hydrogen injection volume QI corresponds to a volume of hydrogen consumed in the fuel cell stack 10 per unit time at the time of detecting the generated current. The hydrogen injection volume QFB is calculated based on a difference between a target anode pressure and the anode pressure Pa detected at Step S121. Note that if the target anode pressure is greater than (>) the detected anode pressure, QFB is greater than (>) 0.

Then, the process goes to Step S123, and the ECU 60 calculates a target hydrogen injection volume Q by adding the hydrogen injection volume QFB to the hydrogen injection volume QI.

After that, the process goes to Step S124, the ECU 60 uses the map shown in FIG. 10 to calculate Ti values (i.e., valve open periods) of the first injector 23A and the second injector 23B. As illustrated in FIG. 10, as the hydrogen injection volume Q increases, the Ti value of the first injector 23A (INJ A) is set to be higher. When the hydrogen injection volume Q is equal to Qs, the valve corresponds to a state of being fully open. In addition, when the hydrogen injection volume Q exceeds Qs, the second injector 23B (INJ BP) operates. As the hydrogen injection volume Q increases, the Ti value becomes higher in this setting.

For example, when the hydrogen injection volume Q is equal to or less than the hydrogen injection volume Qs (i.e., in the case of Q100), only the first injector 23A is in operation and the Ti value (i.e., the valve open period) of the first injector 23A is set to be Ti100. When the hydrogen injection volume Q exceeds the hydrogen injection volume Qs (i.e., in the case of Q200), both the first injector 23A and the second injector 23B are set in operation. The Ti value of the first injector 23A is set to be Ti201 (fully open). The Ti value of the second injector 23B is set to be Ti202. That is, when the hydrogen injection volume injected only from the first injector 23A is insufficient, both the first injector 23A and the second injector 23B are set in operation to supply a necessary hydrogen injection volume.

Finally, the process goes to Step S125, the ECU 60 has only the first injector 23A open for the valve open period Ti100 or has the first injector 23A open for the valve open period Ti201 and the second injector 23B open for the valve open period Ti202 to put hydrogen into the fuel cell stack 10. Note that the target hydrogen injection volume Q calculated is used to determine whether only the first injector 23A or both the first injector 23A and the second injector 23B are employed.

Figure 11:
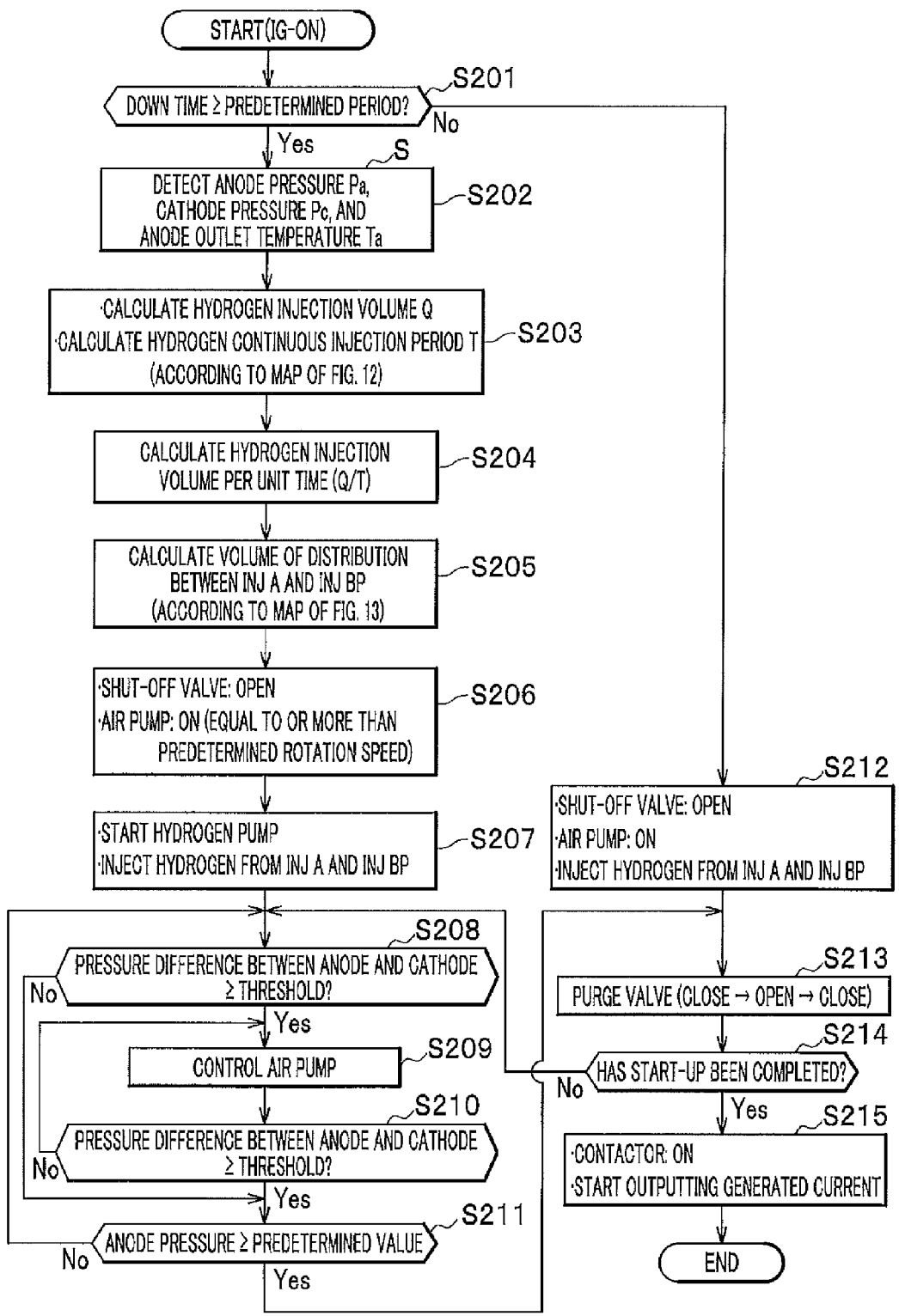
FIG. 11 is a flow chart illustrating how a fuel cell system according to the second embodiment works.

Meanwhile, as illustrated in FIG. 11, during the start-up process of the fuel cell stack 10, an ON-signal of the IG 51 is first detected (i.e., starting the fuel cell stack 10). Next, at Step S201, a down time of the fuel cell stack 10 is measured, and a down-time-determining unit determines whether or not the down time is equal to or more than a predetermined period. Note that, the down time refers to a period from when an OFF-signal is detected to when the ON-signal of the IG 51 is detected (i.e., approximately equal to a power generation down time of the fuel cell stack 10). Also note that the down time is measured with the timer 52.

Further note that the case where the down time is equal to or more than a predetermined period refers to a condition in which there is air in each of the anode passage 12 and the cathode passage 13; when the fuel cell stack 10 is started to supply hydrogen from the inlet 12a of the anode passage 12, a hydrogen concentration difference between the inlet 12a side and the outlet 12b side of the anode passage 12 is generated; and the fuel cell stack 10 thus becomes polarized at a high potential. Of note is that for example, air in the anode passage 12 comes from the cathode passage 13 and air in the cathode passage 13 permeates through an electrolyte membrane into the anode passage 12 during the power generation down time. A mechanism by which the fuel cell stack 10 becomes polarized at a high potential has been already explained and skipped.

At step S201, when the ECU 60 determines that the down time is equal to or more than the predetermined period (i.e., Yes), the process goes to Step S202. When the ECU 60 determines that the down time is less than the predetermined period (i.e., No), the process goes to S212. Note that if the process goes to Step S202, feedback control is cancelled.

At Step S202, the ECU 60 obtains each of an anode pressure Pa, a cathode pressure Pc, and an anode outlet temperature Ta. Note that the anode pressure Pa, the cathode pressure Pc, and the anode outlet temperature Ta are detected with the pressure sensor 28, the pressure sensor 35, and the temperature sensor 29, respectively.

Then, the process goes to Step S203, and the ECU 60 calculates a hydrogen injection volume Q and a hydrogen continuous injection period (continuous supply period) T.

Note that the hydrogen injection volume Q is calculated based on the following equations (A) and (B):

$$Pb = Pc + Pdp; \text{ and} \quad (A)$$

$$Q = (Pb - Pa) \times Va/(R \times (Ta + 273.15)), \quad (B)$$

wherein Pb is an upper limit of anode pressure;
Pdp is an upper limit of a pressure difference between the anode and the cathode;
Va is a volume of anode passage (a fixed value); and
R is a gas constant.

Figure 12:
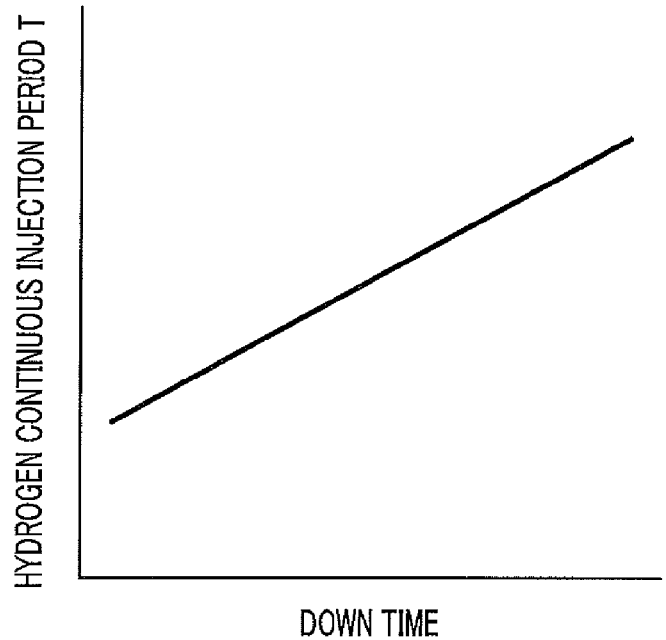
FIG. 12 is a map indicating a relationship between a down time and a hydrogen continuous injection period.

In addition, the hydrogen continuous injection period T is calculated based on the map shown in FIG. 12 (i.e., by a continuous-supply-period-calculating unit). Specifically, in the map of FIG. 12, as the down time increases, the hydrogen continuous injection period T becomes longer. This is because as the down time increases, a ratio of the air in the anode passage 12 becomes higher. In other words, a total amount of air that permeates through an electrolyte membrane from the cathode passage 13 into the anode passage 12 increases. Thus, it is necessary to promote the mixture of the hydrogen and the air inside the anode passage 12 by making the hydrogen continuous injection period longer. Note that the map of FIG. 12 is drawn using a prior test, etc.

Subsequently, the process goes to Step S204, and the ECU 60 calculates a hydrogen injection volume per unit time (Q/T) based on the hydrogen injection volume Q and the hydrogen continuous injection period T as calculated in Step S203.

Figure 13:
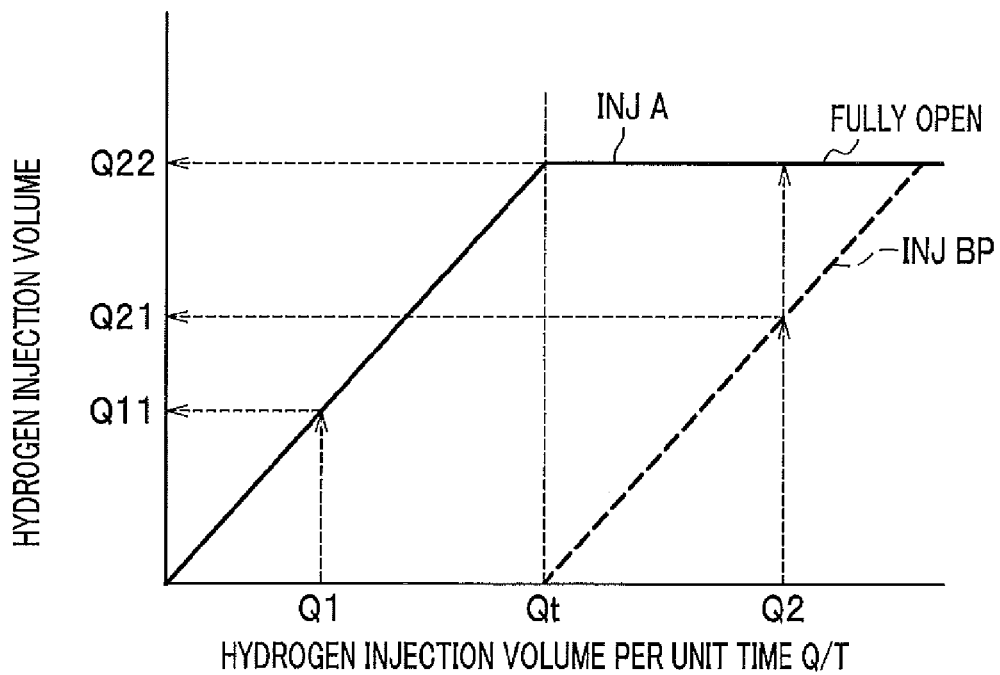
FIG. 13 is a map for calculating a volume of distribution of a hydrogen injection volume.

Then, the process goes to Step S205, the ECU 60 uses the map shown in FIG. 13 to calculate a volume of distribution of hydrogen injections between the first injector 23A and the second injector 23B. As illustrated in FIG. 13, as the hydrogen injection volume per unit time Q/T increases, the hydrogen injection volume of the first injector 23A (INJ A) becomes higher. In this setting, when the hydrogen injection volume per unit time Q/T is equal to Qt, the valve is fully open. Also, when the hydrogen injection volume per unit time Q/T exceeds Qt, the second injector 23B (INJ BP) is actuated. As the hydrogen injection volume per unit time Q/T increases, the hydrogen injection volume becomes higher in this setting.

Specifically, when the hydrogen injection volume per unit time (Q/T) is equal to or less than Qt (i.e., in the case of Q1), only the first injector 23A is in operation and the hydrogen injection volume of the first injector 23A is set to be Q11. On the other hand, when the hydrogen injection volume per unit time (Q/T) exceeds the Qt (i.e., in the case of Q2), both the first injector 23A and the second injector 23B are in operation. The hydrogen injection volume of the first injector 23A is set to be Q22 (fully open). The hydrogen injection volume of the second injector 23B is set to be Q21. In view of the above, the hydrogen injection volume per unit time Q/T calculated is used to determine whether only the first injector 23A is set in operation or both the first injector 23A and the second injector 23B are set in operation.

Then, the process goes to Step S206, and the ECU 60 opens the shut-off valve 22 and drives the air pump 31 at a predetermined rotation speed or higher (i.e., higher than when the power is ordinarily generated). Here, the reason why an amount of the air supplied is increased is to dilute hydrogen contained in anode off-gas discharged from the anode passage 12 when the purge valve 26 is opened at Step S213 as described below.

Subsequently, the process goes to Step S207, and the ECU 60 starts the hydrogen pump 27 and hydrogen is injected from the first injector 23A (or both the first injector 23A and the second injector 23B). Note that Steps S202, S203, S204, S205, and S207 in this embodiment correspond to a process executed by a constant-injector-operation-driving unit.

Subsequently, the process goes to Step S208, and the ECU 60 determines whether or not the pressure difference between the anode and the cathode of the fuel cell stack 10 is equal to or more than a threshold. Note that the pressure difference between the anode and the cathode is a value obtained by subtracting the cathode pressure Pc detected with the pressure sensor 35 from the anode pressure Pa detected with the pressure sensor 28. In addition, the threshold corresponds to an upper limit Pdp of the pressure difference between the anode and the cathode.

At Step S208, if the ECU 60 determines that the pressure difference between the anode and the cathode is equal to or more than the threshold (i.e., Yes), the process goes to Step S209. If the ECU 60 determines that the pressure difference between the anode and the cathode is less than the threshold (i.e., No), the process goes to S211.

At Step S209, the ECU 60 controls the air pump 31. Specifically, hydrogen is injected from the first injector 23A (or both the first injector 23A and the second injector 23B) to increase the anode pressure Pa. Accordingly, when the pressure difference between the anode and the cathode is equal to or more than the threshold, the ECU 60 increases a rotation speed (driving amount) of a motor of the air pump 31. This makes it possible to adjust the pressure difference (i.e., the pressure difference between the anode and the cathode) between the anode pressure Pa and the cathode pressure Pc to a pressure which does not become too large.

Next, the process goes to the Step S210, and the ECU 60 adjusts the cathode pressure Pc by using the air pump 31. Then, the ECU 60 determines whether or not the pressure difference between the anode and the cathode is less than the threshold. When the ECU 60 determines that the pressure difference between the anode and the cathode is less than the threshold (i.e., Yes), the process goes to S211. When the ECU 60 determines that the pressure difference between the anode and the cathode is not less than the threshold (i.e., No), the process returns to S209.

Note that Steps S208, S209, and S210 in the second embodiment correspond to a process executed by a start-up-differential-pressure-adjusting unit.

At Step S211, the ECU 60 determines whether or not the anode pressure Pa detected with the pressure sensor 28 is equal to or more than a predetermined value. Note that the predetermined value is set to be a pressure (i.e., a target pressure) required for offsetting the hydrogen concentration difference between the inlet 12a side and the outlet 12b side of the anode passage 12. Also, the predetermined value is determined based on a prior test, etc. Further note that the predetermined value is not limited to a pressure value, but may be defined based on a time course.

At Step S211, when the ECU 60 determines that the anode pressure Pa is less than the predetermined value (i.e., No), the process returns to Step S208. When the ECU 60 determines that the anode pressure Pa is equal to or more than the predetermined value (i.e., Yes), the process goes to S213.

At Step S213, the ECU 60 controls the opening and closing of the purge valve 26. Note that the reason why the opening and closing control of the purge valve 26 starts after initiation of operation of the first injector 23A and the second injector 23B is to offset the hydrogen concentration difference between the inlet 12a side and the outlet 12b side of the anode passage 12 at an earlier time point by quickly increasing the anode pressure Pa. In addition, even if the purge valve 26 is opened at this step, highly concentrated hydrogen is not emitted outside a vehicle because an operating pressure of the air pump 31 is higher than that during ordinary power generation.

Also, at Step S213, although the following is not indicated on a figure, the ECU 60 switches the operation of the first injector 23A from the fully open operation to the valve-opening control operation in which the first injector 23A opens in response to the purge valve 26 opening with the valve of the second injector 23B kept closed. That is, the ECU 60 controls the opening and closing (i.e., controls the Ti value; the Ti value <the interval) of the valve of the first injector 23A in such a way that an amount (volume) of hydrogen that is equal to an amount of the gas discharged from through the purge valve 26 while it is open is injected through the first injector 23A. Thus, the first injector 23A is controlled so as to keep the anode pressure Pa constant.

After that, the process goes to Step S214, and the ECU 60 determines whether or not the start-up has been completed. The case where the start-up has been completed refers to a case where the ECU 60 determines that a predetermined volume of gas has been purged (exhausted) since the opening (opening and closing) of the purge valve 26. Whether or not the predetermined volume of gas has been purged can be determined based on, for example, the valve open period of the purge valve 26.

At Step S214, if the ECU 60 determines that the start-up has not been completed (i.e., No), the process returns to Step S208. If the ECU 60 determines that the start-up has been completed (i.e., Yes), the process goes to Step S215.

At step S215, the ECU 60 turns on the contactor 45 (i.e., connects the fuel cell stack 10 to the external load), and starts to have the fuel cell stack 10 output a generated current. Note that if the rotation speed of the air pump 31 is higher than that required for ordinary power generation, the rotation speed is decreased to a normal level. The generated current outputted from the fuel cell stack 10 is supplied to the external load such as the motor 41 and the air pump 31. In addition, the ECU 60 controls the opening and closing (i.e., controls the Ti value) of the first injector 23A in accordance with how large the generated current outputted from the fuel cell stack 10 is.

Further, at step S201, when the ECU 60 determines that the down time is less than the predetermined period (i.e., No), the process goes to Step S212. Then, the ECU 60 opens the shut-off valve 22, turns on the air pump 31 (at a rotation speed during ordinary start-up), and further injects hydrogen from the first injector 23A (or both the first injector 23A and the second injector 23B). After that, the ECU 60 executes processes of Steps S213 to S215. Note that in this case (i.e., at Step S201, No), feedback control is applied to the first injector 23A (or both the first injector 23A and the second injector 23B).

FIG. 8 has already been used to detail a mechanism by which a hydrogen concentration difference between the inlet 12a side and the outlet 12b side of the anode passage 12 causes the fuel cell stack 10 to remain polarized at a high potential. Hence, their description is omitted.

Figure 14:
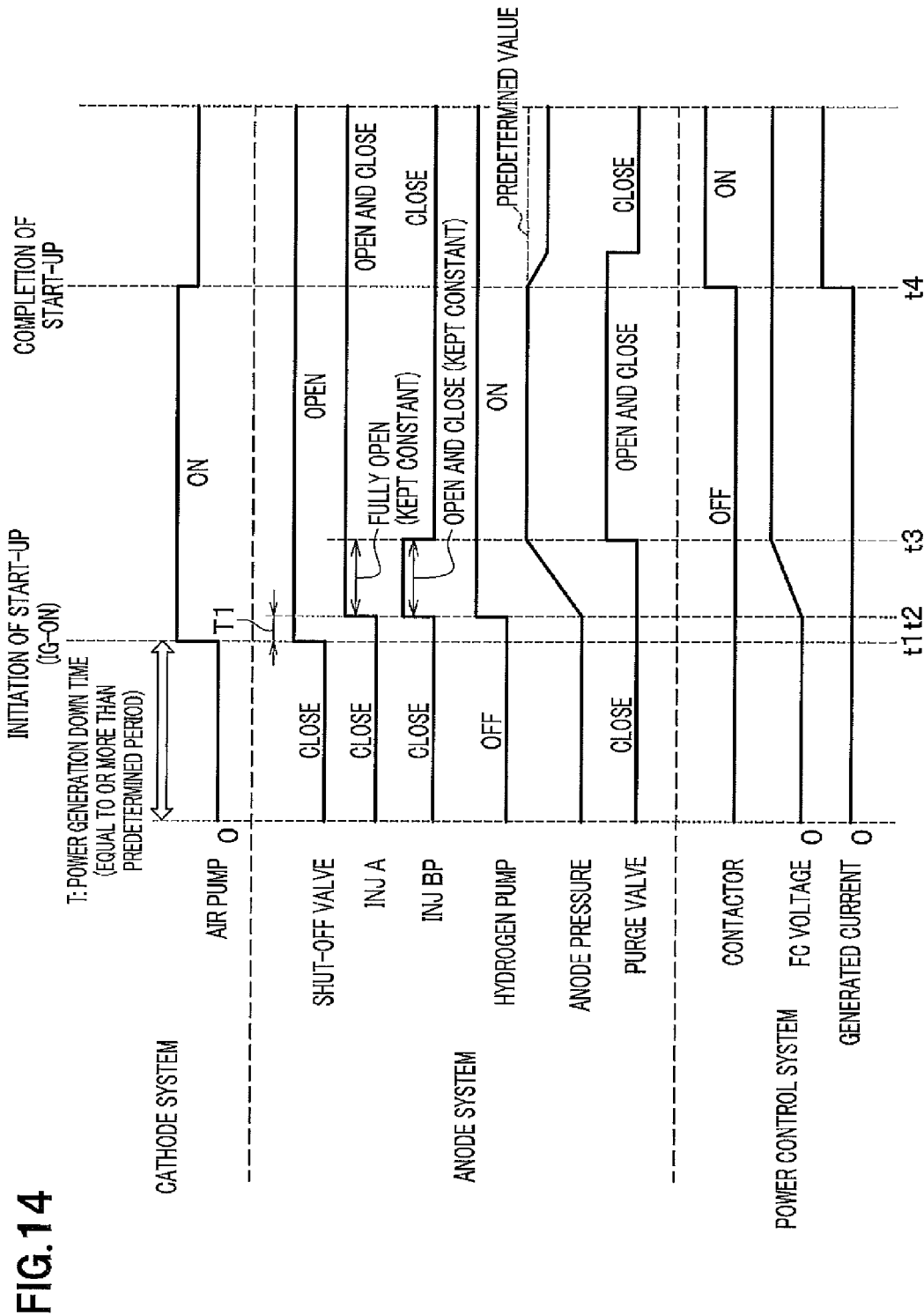
FIG. 14 is a time chart illustrating an example of how to operate a fuel cell system according to the second embodiment.

Meanwhile, with reference to the time chart shown in FIG. 14, the operation of the fuel cell system of the second embodiment is explained. Note that the following describes, as an example, the case where both the first injector 23A and the second injector 23B are operated. In addition, in this description, the second injector 23B has an ability to inject a larger volume of hydrogen than the first injector 23A.

At time t1, a start signal of the IG 51 (i.e., start-up of the fuel cell stack 10) is detected. At that time, if the ECU 60 determines that the down time is equal to or more than the predetermined period (i.e., at Step S201, Yes), the control operation of the first injector 23A and the second injector 23B goes to a process to stop the feedback control on the first injector 23A and the second injector 23B. This process starts with the ECU 60 opening the shut-off valve 22 and operating the air pump 31 (at a predetermined rotation speed or higher) (i.e., Step S206).

Next, at time t2 when a predetermined period T1 has passed since the time t1, the ECU 60 starts to continuously opens (i.e., fully opens) the valve of the first injector 23A (INJ A) and periodically opens the valve of the second injector 23B (INJ BP). While this valve control is under way, the first injector 23A and the second injector 23B are controlled to inject hydrogen with the valve open period (i.e., the Ti value, a valve open rate) per interval (drive period) of each of the first injector 23A and the second injector 23B being kept constant. That is, the Ti value of the first injector 23A is equal to the interval so that the valve of the first injector 23A is continuously opened (i.e., fully opened). On the other hand, the Ti value of the second injector 23B is kept smaller than the interval so that the valve of the second injector 23B is periodically opened. By doing so, the anode pressure Pa increases gradually and the voltage of the fuel cell stack 10 (i.e., the FC voltage) also increases.

Since the hydrogen pump 27 starts at the time t2, a gas flow is established in a circulation passage including the anode passage 12 and the pipes 26a, 27a, 27b, and 24a. Consequently, the mixture of the air and the hydrogen can be facilitated in the anode passage 12. Note that the hydrogen pump 27 may be started at the time t1 prior to the time t2 when the first injector 23A and the second injector 23B start operating. This operation can create the gas flow in the circulation passage before the first injector 23A and/or the second injector 23B supply hydrogen, thereby capable of promoting the mixture of the air and the hydrogen.

Then, at time t3 when the anode pressure Pa reaches a predetermined value (i.e., a target pressure), the ECU 60 starts controlling the opening and closing of the purge valve 26 (i.e., at Step S211, Yes; Step S213). In addition, at the time t3, the ECU 60 controls the Ti value of the first injector 23A and the opening of the purge valve 26. Depending on an amount of purging gas (a hydrogen volume) that is emitted outside a vehicle, the valve of the first injector 23A is periodically opened with the valve of the second injector 23B kept closed (i.e., the Ti value=0). Note that even if the opening and closing of the purge valve 26 is controlled after the opening of the valves of the first injector 23A and the second injector 23B, highly concentrated hydrogen (with a predetermined concentration) is not going to be emitted outside a fuel cell vehicle because the rotation speed of the air pump 31 is set to be higher than that during ordinary start-up.

Then, at time t4 when a predetermined period has passed since the ECU 60 starts controlling the opening and closing of the purge valve 26, and the ECU 60 determines that the start-up process has been completed (i.e., at Step S214, Yes). At that time, the contactor 45 is turned on, and the process enters ordinary power generation during which the generated current is outputted from the fuel cell stack 10 (i.e., Step S215).

As described above, in the fuel cell system 1 according to this embodiment, the feedback control (see FIG. 2) on the first injector 23A and the second injector 23B is stopped (i.e., the feedback control is prohibited) during the start-up process of the fuel cell stack 10. Thus, hydrogen is being injected while the Ti value (i.e., the valve open period) per interval (drive period) is kept constant. Accordingly, when the fuel cell stack 10 starts under a condition under which the inner gas of the anode passage is replaced with air during the power generation down time so that the anode passage 12 and the cathode passage 13 each have the air, the air and the fuel gas can be efficiently mixed in the anode passage 12. As a result, the fuel cell stack 10 is prevented from remaining polarized at a high potential and deterioration of the fuel cell stack 10 is suppressed.

Meanwhile, as illustrated in a Comparative Embodiment of FIG. 15B, if feedback control is used to control the injectors (i.e., the first injector 23A and the second injector 23B) in the fuel cell system 1, a valve open period per interval (drive period), Ti10 (i.e., a valve open period), to actuate the injectors is determined simply based on a target anode pressure calculated at start-up of the fuel cell stack 10, (e.g., the valves of the first injector 23A and the second injector 23B are nearly fully opened). Then, the anode pressure quickly reaches the target anode pressure and a hydrogen supply from the injectors is going to be terminated. When the operation of the injectors restarts (with the valve open period per interval being Ti11) after the hydrogen supply termination, the hydrogen is supplied until the anode pressure reaches the target anode pressure. If the hydrogen supply is initiated and then stopped halfway, the hydrogen is supplied into the anode passage 12 intermittently. As illustrated in FIG. 8, if the inlet 12a side of the anode passage 12 has hydrogen and the inlet side of the cathode passage 13 has oxygen, the mixture of the air and the hydrogen is not promoted in the anode passage 12 and air remains at each of the outlet 12b side of the anode passage 12 and the outlet side of the cathode passage 13 for a long time, which leads to the fuel cell stack 10 being kept polarized at a high potential for a long time.

Here, in this embodiment, the feedback control is prohibited during the start-up process of the fuel cell stack 10 as illustrated in FIG. 15A. While the valve open period per interval (drive period) is kept constant, the injectors (the first injector 23A and the second injector 23B) are controlled. Accordingly, the injectors can be consistently operated without stopping halfway until an anode pressure reaches the target anode pressure (i.e., a target pressure). This operation promotes the mixture of the hydrogen and the air in the anode passage 12 and makes it possible to prevent the fuel cell stack 10 from being polarized at a high potential for a long time. Note that FIG. 15A is an image indicating a condition in which the Ti value per interval is fixed without distinction between the first injector 23A and the second injector 23B.

Specifically, in this embodiment, the first injector is made to be fully opened and fixed (see INJ A from times t2 to t3 of FIG. 14), and the second injector 23B is opened and closed, which operation is fixed (see INJ BP from times t2 to t3 of FIG. 14). Accordingly, hydrogen is supplied from the first injector 23A and the second injector 23B. After that, when the anode pressure Pa reaches the target pressure, the operation of the first injector 23A is switched from fully open operation (i.e., fixed operation) to the opening and closing control (see INJ A after time t3 of FIG. 14). An amount of hydrogen discharged through the purge valve is supplied. In this regard, the second injector 23B is fully closed (see INJ BP after time t3 of FIG. 14).

Note that a degree of opening (i.e., a Ti value) of the second injector 23B from times t2 to t3 in FIG. 14 is determined according to the target pressure and should be determined so as not to increase the anode pressure too quickly. In this regard, however, if the anode pressure rises too quickly, the hydrogen supply becomes intermittent, which does not promote the mixture of the air and the hydrogen. Accordingly, the Ti value of the second injector 23B is given an upper limit, at and below which the anode pressure is prevented from quickly rising, hydrogen is continually supplied and the mixture of the air and the hydrogen is promoted.

In addition, as illustrated in FIG. 15A, an increase rate of the anode pressure Pa to increase the anode pressure Pa to a predetermined value (i.e., a target pressure) in a predetermined period is predetermined based on a prior test, etc. Taking deterioration and durability of the fuel cell stack 10 into consideration, the increase rate is set to a value (i.e., a target pressure, a predetermined period) for which the fuel cell stack 10 is not polarized at a high potential for a long time.

Further, in this embodiment, when the down time is determined to be equal to or more than the predetermined period, that is, only when the fuel cell stack 10 starts under a condition under which the anode passage 12 and the cathode passage 13 each have air, the first injector 23A (or both the first injector 23A and the second injector 23B) is in operation with a fixed valve open period value per interval being Ti. This operation can prevent hydrogen from being continually supplied by keeping the valve open period per interval constant when the hydrogen supply is unnecessary, and the unnecessary (excessive) hydrogen supply is avoided.

Furthermore, this embodiment includes such a configuration to enable to have the hydrogen continuous injection period (i.e., a continuous supply period) becomes longer (see Step S203 of FIG. 11, and FIG. 12)as the down time increases. According to this configuration, the hydrogen continuous injection period (i.e., a target pressure) is varied depending on a ratio of the air in the anode passage 12, which prevents the first injector 23A and the second injector 23B from being kept in operation for an unnecessarily (wastefully) long time and reduces power consumption.

In addition, this embodiment has such a configuration as to have the pressure difference between the anode and the cathode adjusted to less than the threshold by changing the rotation speed (driving amount) of the air pump 31, when the pressure difference between the anode and the cathode is equal to or more than the threshold during operation of the first injector 23A (or both the first injector 23A and the second injector 23B) at start-up of the fuel cell stack 10. This configuration keeps the pressure difference between the anode and the cathode from becoming too large, and can therefore prevent the fuel cell stack 10 from being damaged.

Note that the present invention is not limited to the above embodiment, and may be appropriately modified within an extent not departing from the scope of the present invention. Provided that the feedback control is prohibited during start-up of the fuel cell stack 10 in the second embodiment, the case where the down time is determined to be equal to or more than the predetermined period has been taken as an example for description. This description is not limited to just this case. For example, in order to protect the fuel cell stack 10 from freezing, whether or not air (oxidant gas) is used to scavenge the anode passage 12 during the power generation down time may be considered for the determination.

Specifically, although not shown in figures, the system may include an anode-scavenging inlet pipe which connects the pipes 31a and 24a and a scavenging inlet valve which blocks this anode-scavenging inlet pipe. Then if air from the air pump 31 is injected via the anode-scavenging inlet pipe into a passage including the anode passage 12 by opening the scavenging inlet valve and the purge valve 26 to scavenge the passage during the power generation down time, the inner gas of the anode passage 12 is replaced with the air. Thus, when the anode passage is scavenged as explained, such a process as to have the injectors driven (the first injector 23A and the second injector 23B) with the valve open period per interval being kept constant (i.e., the feedback control is prohibited) during start-up of the fuel cell stack 10 may be executed.

Meanwhile, the first and second embodiments are used to describe, as an example, the case of having installed the first injector 23A and the second injector 23B. The fuel cell system, however, may include a single injector (e.g., the first injector 23A). Alternatively, the second injector 23B may be replaced by a valve which can operate at a constant flow rate and for a certain period.

The invention claimed is:

1. A fuel cell system comprising:
   a fuel cell having an anode passage through which fuel gas is supplied to an anode and a cathode passage through which oxidant gas is supplied to a cathode;
   a fuel gas inlet passage through which the fuel gas is injected into the fuel cell;
   a fuel off-gas outlet passage through which fuel off-gas is discharged from the fuel cell;
   a fuel-gas-pressure-adjusting-and-supplying unit which is disposed on the fuel gas inlet passage and is configured to adjust a pressure of the fuel gas to supply the fuel gas to the anode passage;
   an anode-passage-gas-replacement-determining unit which is configured to determine, at start-up of the fuel cell, whether or not inner gas of the anode passage is replaced with the oxidant gas; and
   a high-pressure-fuel-gas-supply-controlling unit which is configured to control a supply of the fuel gas to the anode passage while setting a target pressure of the fuel gas supplied to the anode passage by using the fuel-gas-pressure-adjusting-and-supplying unit to be higher than a pressure when the inner gas of the anode passage is not replaced with the oxidant gas if the anode-passage-gas-replacement-determining unit determines at start-up of the fuel cell that the inner gas of the anode passage is replaced with the oxidant gas.

2. The fuel cell system according to claim 1, wherein the anode-passage-gas-replacement-determining unit is further configured to determine that the inner gas of the anode passage is replaced with the oxidant gas when a power generation down time before the start-up of the fuel cell is equal to or more than a predetermined period; and
   when the anode-passage-gas-replacement-determining unit determines that the inner gas of the anode passage is replaced with the oxidant gas, the high-pressure-fuel-gas-supply-controlling unit is further configured to set the target pressure to be higher than the pressure when the power generation down time is less than the predetermined period.

3. The fuel cell system according to claim 2, wherein the high-pressure-fuel-gas-supply-controlling unit is further configured to set the target pressure to be higher as the power generation down time of the fuel cell becomes longer.

4. The fuel cell system according to claim 1, wherein the high-pressure-fuel-gas-supply-controlling unit is further configured to set a pressure increase in the fuel gas supplied to the anode passage to be lower when the fuel cell system starts than a pressure increase during ordinary power generation.

5. The fuel cell system according to claim 1, further comprising:
   a connection passage which connects the fuel gas inlet passage and the fuel off-gas outlet passage;
   a circulator which is disposed partway through the connection passage and returns the fuel off-gas discharged from an outlet of the anode passage to an inlet of the anode passage; and
   a circulator-operation-starting unit which is configured to start operation of the circulator before the high-pressure-fuel-gas-supply-controlling unit supplies the fuel gas.

6. The fuel cell system according to claim 1, wherein the fuel-gas-pressure-adjusting-and-supplying unit is an electronically-controlled injector.

7. The fuel cell system according to claim 6, wherein the high-pressure-fuel-gas-supply-controlling unit is further configured to keep a valve of the injector open.

8. The fuel cell system according to claim 1, wherein the high-pressure-fuel-gas-supply-controlling unit is further configured to drive the injector while keeping a valve open period per drive period of the injector constant.

9. A fuel cell system comprising:
   a fuel cell having an anode passage through which fuel gas is supplied to an anode and a cathode passage through which oxidant gas is supplied to a cathode;
   a fuel gas inlet passage through which the fuel gas is injected into the anode passage;
   a fuel off-gas outlet passage through which fuel off-gas is discharged from the anode passage;
   an injector which is disposed across the fuel gas inlet passage and is configured to supply to the anode passage the fuel gas; and
   a control unit which performs feedback control on the injector,
   wherein the control unit comprises a continuous-injector-operation-driving unit configured to drive the injector during start-up of the fuel cell in such a way that a valve of the injector opens periodically at a constant interval with a valve open period in an injector drive period being kept constant and the feedback control on the injector being prohibited, and
   wherein the control unit is configured to supply the fuel gas to the anode passage while setting a target pressure of the fuel gas supplied to the anode passage to be higher than a pressure when an inner gas of the anode passage is not replaced with the oxidant gas if the control unit determines at start-up of the fuel cell that the inner gas of the anode passage is replaced with the oxidant gas.

10. The fuel cell system according to claim 9, further comprising a down-time-determining unit which is configured to determine whether or not a down time before the start-up of the fuel cell is equal to or more than a predetermined period,
    wherein the constant-injector-operation-driving section is configured to operate the injector while keeping constant the valve open period per drive period when the down-time-determining unit determines that the down time is equal to or more than the predetermined period.

11. The fuel cell system according to claim 10, further comprising a continuous-supply-period-calculating unit which is configured to calculate a continuous supply period for the fuel gas when the constant-injector-operation-driving unit drives the injector,
wherein the continuous-supply-period-calculating unit is further configured to make the continuous supply period longer as the down time become longer.

12. The fuel cell system according to claim 9, further comprising:
an oxidant-gas-supplying unit which supplies the oxidant gas to the cathode passage;
an interelectrode-pressure-difference detecting unit configured to detect a pressure difference between an anode side and a cathode side of the fuel cell; and
a start-up-differential-pressure-adjusting unit configured to adjust a driving of the oxidant-gas-supplying unit to have the pressure difference decreased to less than a threshold when the pressure difference is equal to or more than the threshold while the constant-injector-operation-driving unit is driving the injector during the start-up of the fuel cell.

13. The fuel cell system according to claim 1 further comprising:
an ejector interposed in the fuel gas inlet passage;
a first injector interposed in the fuel gas inlet passage upstream of the ejector and, the first injector being driven by the high-pressure-fuel-gas-supply-controlling unit to open for injecting the fuel gas into the anode passage;
a bypass passage to connect an upstream portion of the fuel gas inlet passage upstream of the first injector and a downstream portion of the fuel gas inlet passage downstream of the ejector; and
a second injector interposed in the bypass passage, the second injector being driven by the high-pressure-fuel-gas-supply-controlling unit to open for injecting the fuel gas into the anode passage,
wherein an opening period of the first injector is determined by the high-pressure-fuel-gas-supply-controlling unit in such a way that an injection volume of the first injector is larger when the fuel cell system starts up than when the fuel cell is generating power.

14. The fuel cell system according to claim 13, wherein the second injector is controlled by the high-pressure-fuel-gas-supply-controlling unit to open and close in an interval and an opening time of the second injector is set to be shorter than an interval to supply hydrogen intermittently.

15. The fuel cell system according to claim 9, further comprising:
a connection passage to feed a part of fuel off-gas back to the fuel gas inlet passage;
an ejector installed at a connection point downstream of the injector and where the connection passage is connected with the fuel gas inlet passage; and
wherein the control unit further comprises:
a continuous hydrogen injection period calculation section configured to set a longer continuous hydrogen injection with a ratio of air in the anode passage becoming higher;
a hydrogen injection volume calculation section configured to set a larger injection volume of hydrogen with the ratio of the air in the anode passage becoming higher; and
an injector injection volume calculation section configured to calculate an injection volume through the first injector per a unit time based on the injection volume of hydrogen so that hydrogen is continuously supplied during the continuous hydrogen injection period, and
wherein the valve open period is determined based on the hydrogen injection volume calculated by the hydrogen injection volume calculation section.

16. The fuel cell system according to claim 9 further comprising
a purge valve interposed in a fuel off-gas discharge passage,
wherein the purge valve is kept closed until the pressure of the anode passage becomes the target pressure.

17. The fuel cell system according to claim 9 further comprising:
a connection passage to feed a part of fuel off-gas back to the fuel gas inlet passage;
an ejector installed at a connection point downstream of the injector and where the connection passage is connected with the fuel gas inlet passage; and
a bypass passage,
wherein the injector consists of a first injector that is interposed in the fuel gas inlet passage upstream of the ejector and a second injector interposed in the bypass passage, the bypass passage connects an upstream portion of the fuel gas inlet passage upstream of the first injector and a downstream portion of the fuel gas inlet passage downstream of the ejector, and the control section sets an upper limit to a valve open period for the second injector.

* * * * *